US010943583B1

(12) United States Patent
Gandhe et al.

(10) Patent No.: US 10,943,583 B1
(45) Date of Patent: Mar. 9, 2021

(54) CREATION OF LANGUAGE MODELS FOR SPEECH RECOGNITION

(71) Applicant: Amazon Technologies, Inc., Seattle, WA (US)

(72) Inventors: Ankur Gandhe, Bothell, WA (US); Ariya Rastrow, Seattle, WA (US); Shaswat Pratap Shah, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 155 days.

(21) Appl. No.: 15/933,838

(22) Filed: Mar. 23, 2018

Related U.S. Application Data

(60) Provisional application No. 62/534,964, filed on Jul. 20, 2017.

(51) Int. Cl.
| | | |
|---|---|---|
| *G10L 15/18* | (2013.01) | |
| *G10L 15/06* | (2013.01) | |
| *G10L 25/27* | (2013.01) | |
| *G06F 16/31* | (2019.01) | |
| *G06F 16/33* | (2019.01) | |

(52) U.S. Cl.
CPC .......... *G10L 15/18* (2013.01); *G06F 16/313* (2019.01); *G06F 16/3347* (2019.01); *G10L 15/063* (2013.01); *G10L 25/27* (2013.01)

(58) Field of Classification Search
CPC ....... G10L 15/18; G10L 15/063; G10L 25/27; G06F 16/3347; G06F 16/313
See application file for complete search history.

(56) References Cited

U.S. PATENT DOCUMENTS

| | | | | | |
|---|---|---|---|---|---|
| 4,831,550 | A * | 5/1989 | Katz | ...................... | G06K 9/723 |
| | | | | | 704/240 |
| 6,725,194 | B1 * | 4/2004 | Bartosik | ............... | G10L 15/075 |
| | | | | | 704/235 |
| 8,275,621 | B2 * | 9/2012 | Alewine | ................. | G10L 13/08 |
| | | | | | 704/231 |
| 9,047,868 | B1 * | 6/2015 | O'Neill | ................. | G10L 15/197 |
| 9,502,032 | B2 * | 11/2016 | Aleksic | ................... | G10L 15/22 |
| 9,966,066 | B1 * | 5/2018 | Corfield | ................ | G10L 15/193 |

(Continued)

OTHER PUBLICATIONS

Kneser, et al., "On the Dynamic Adaptation of Stochastic Language Models," in Acoustics, Speech, and Signal Processing, 1993. ICASSP-93, vol. 2, pp. 586-589.

(Continued)

*Primary Examiner* — Mohammad K Islam
(74) *Attorney, Agent, or Firm* — Pierce Atwood LLP

(57) ABSTRACT

A system to perform automatic speech recognition (ASR) using a dynamic language model. Portions of the language model can include a group of probabilities rather than a single probability. At runtime individual probabilities of the group are weighted and combined to create an adjusted probability for the portion of the language model. The adjusted probability can be used for ASR processing. The weights can be determined based on a characteristic of the utterance, for example an associated speechlet/application, the specific user speaking, or other characteristic. By applying the weights at runtime the system can use a single language model to dynamically adjust to different utterance conditions.

25 Claims, 18 Drawing Sheets

(56) References Cited

U.S. PATENT DOCUMENTS

| | | | | |
|---|---|---|---|---|
| 9,978,367 | B2* | 5/2018 | Aleksic | G10L 15/22 |
| 10,127,908 | B1* | 11/2018 | Deller | G10L 15/22 |
| 10,140,973 | B1* | 11/2018 | Dalmia | G06F 17/2785 |
| 10,192,552 | B2* | 1/2019 | Raitio | G10L 13/033 |
| 10,217,452 | B2* | 2/2019 | Kayama | G10L 25/90 |
| 10,276,149 | B1* | 4/2019 | Liang | G10L 13/033 |
| 10,319,250 | B2* | 6/2019 | Lokeswarappa | G09B 5/04 |
| 10,319,365 | B1* | 6/2019 | Nicolis | G10L 13/10 |
| 10,339,925 | B1* | 7/2019 | Rastrow | H04M 3/527 |
| 10,388,272 | B1* | 8/2019 | Thomson | G10L 15/063 |
| 10,448,115 | B1* | 10/2019 | Jamal | H04N 21/42203 |
| 10,468,027 | B1* | 11/2019 | Deller | H04L 67/12 |
| 2005/0273337 | A1* | 12/2005 | Erell | G10L 13/08 704/260 |
| 2006/0085183 | A1* | 4/2006 | Jain | G10L 17/26 704/233 |
| 2007/0162272 | A1* | 7/2007 | Koshinaka | G06F 17/2775 704/9 |
| 2011/0282643 | A1* | 11/2011 | Chatterjee | G06F 17/2818 704/2 |
| 2014/0136970 | A1* | 5/2014 | Xiao | G06F 17/24 715/271 |
| 2015/0243181 | A1* | 8/2015 | Somasundaran | G06F 17/274 434/167 |
| 2016/0093287 | A1* | 3/2016 | Bangalore | G10L 13/06 704/260 |
| 2016/0379638 | A1* | 12/2016 | Basye | G10L 15/22 704/235 |
| 2017/0011344 | A1* | 1/2017 | Choi | G06Q 10/04 |
| 2017/0116978 | A1* | 4/2017 | Matsubara | G10L 15/22 |
| 2017/0358301 | A1* | 12/2017 | Raitio | G10L 13/033 |
| 2018/0053502 | A1* | 2/2018 | Biadsy | G10L 15/197 |
| 2018/0122361 | A1* | 5/2018 | Silveira Ocampo | G10L 13/0335 |

OTHER PUBLICATIONS

Suzuki, et al., "A Comparative Study on Language Model Adaptation Techniques Using New Evaluation Metrics," in Proceedings of the conference on Human Language Technology and Empirical Methods in Natural Language Processing. Association for Computation Linguistics, 2005, pp. 265-272.

Axelrod, et al., "Domain Adaptation Via Pseudo in-Domain Data Selection," in Proceedings of the conference on Empirical Methods in Natural Language Processing. Association for Computation Linguistics, 2011, pp. 355-362.

Chen, et al., "Language Model Adaptation for Broadcast News Transcription," in ISCA Tutorial and Research Workshop (ITRW) on Adaptation Methods for Speech Recognition, 2001.

Kneser, et al., "Language Model Adaptation Using Dynamic Marginals." in Eurospeech, 1997.

Bellegrada, "Exploiting Latent Semantic Information in Statistical Language Modeling," Proceedings of the IEEE, vol. 88, No. 8, pp. 1279-1296, 2000.

Clarkson, et al. ,"Language Model Adaptation Using Mixtures and an Exponentially Decaying Cache," in Acoustics, Speech, and Signal Processing, 1997. ICASSP-97., 1997 IEEE International Conference on. IEEE, 1997, vol. 2, pp. 199-802.

Tam, et al., "Dynamic Language Model Adaptation Using Variational Bayes Inference.," in INTERSPEECH, 2005, pp. 5-8.

Scheiner, et al., "Voice Search Language Model Adaptation Using Contextual Information," in Spoken Language Technology Workshop (SLT), 2016 IEEE, 2016, pp. 253-257.

Michaely, et al., "Unsupervised Context Learning for Speech Recognition," in Spoken Language Technology (SLT) Workshop, 2016.

Ballinger, et al., "On-demand Language Model Interpolation for Mobile Speech input," in INTERSPEECH, 2010.

Pennington, et al., "Glove: Global Vectors for Word Representation".

Chen, et al., "An Empirical Study of Smoothing Techniques for Language Modeling," in Proceedings of the 34th Annual Meeting on Association for computational Linguistics, 1996, pp 310-318.

Parthasarathi, et al., "fMLLR Based Feature-Space Speaker Adaption of DNN Acoustics Models," in Proceedings Interspeech, 2015.

Garimella, et al., "Robust i-Vector Based Adaptation of DNN Acoustic Model for Speech Recognition," in Proceedings Interspeech, 2015.

Zhao et al. "Criterion Functions for Document Clustering" University of Minnesota, Department of Computer Science/Army HPC Research Center, 2002.

D. Defays, "An Efficient Algorithm for a Complete Link Method," The Computer Journal, vol. 20, No. 4, pp. 364, 1977.

Mikolov, et al., "Context dependent Recurrent Neural Network Language Model." SLT, vol. 12, pp. 234-239, 2012.

Chen et al., "Recurrent Neural Network Language Model Adaptation for Multi-genre Broadcast Speech Recognition." in INTERSPEECH, vol. 15, 2015, pp. 3511-3515.

Mohri, et al., "Weighted Finite-state Transducers in Speech Recognition," computer Speech & Language, vol. 16, No. 1, pp. 69-88, 2002.

Maaten, et al., "Visualizing Data Using t-snne," Journal of Machine Learning Research, vol. 9, No. Nov, pp. 364, 1977.

"Alexa Skills Kit," https://developer.amazon.com/alexa-skills-kit.

* cited by examiner

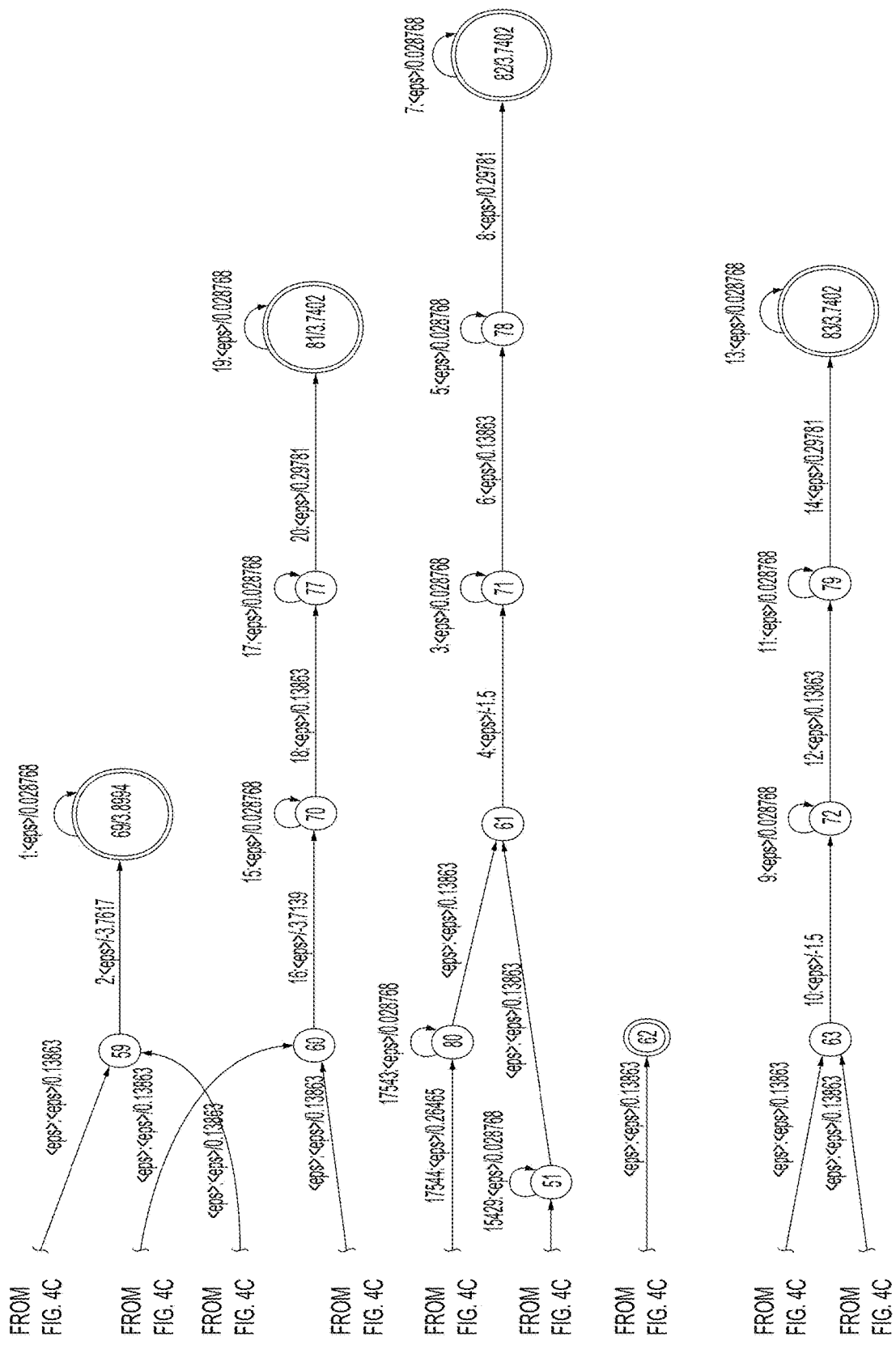

Clustering at intent level

Clustering at application level

CREATION OF LANGUAGE MODELS FOR SPEECH RECOGNITION

CROSS-REFERENCE TO RELATED APPLICATIONS

This application claims the benefit of priority to U.S. Provisional Patent Application 62/534,964, filed Jul. 20, 2017, entitled AUTOMATIC DOMAIN DISCOVERY AND ADAPTATION OF LANGUAGE MODEL FOR SPEECH RECOGNITION, in the names of Ankur Gandhe, et al., the contents of which is expressly incorporated herein by reference in its entirety.

BACKGROUND

Speech recognition systems have progressed to the point where humans can interact with computing devices relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also convert a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 4A-4D illustrate a section of a finite state transducer according to embodiments of the present disclosure.

DETAILED DESCRIPTION

Figure 1:
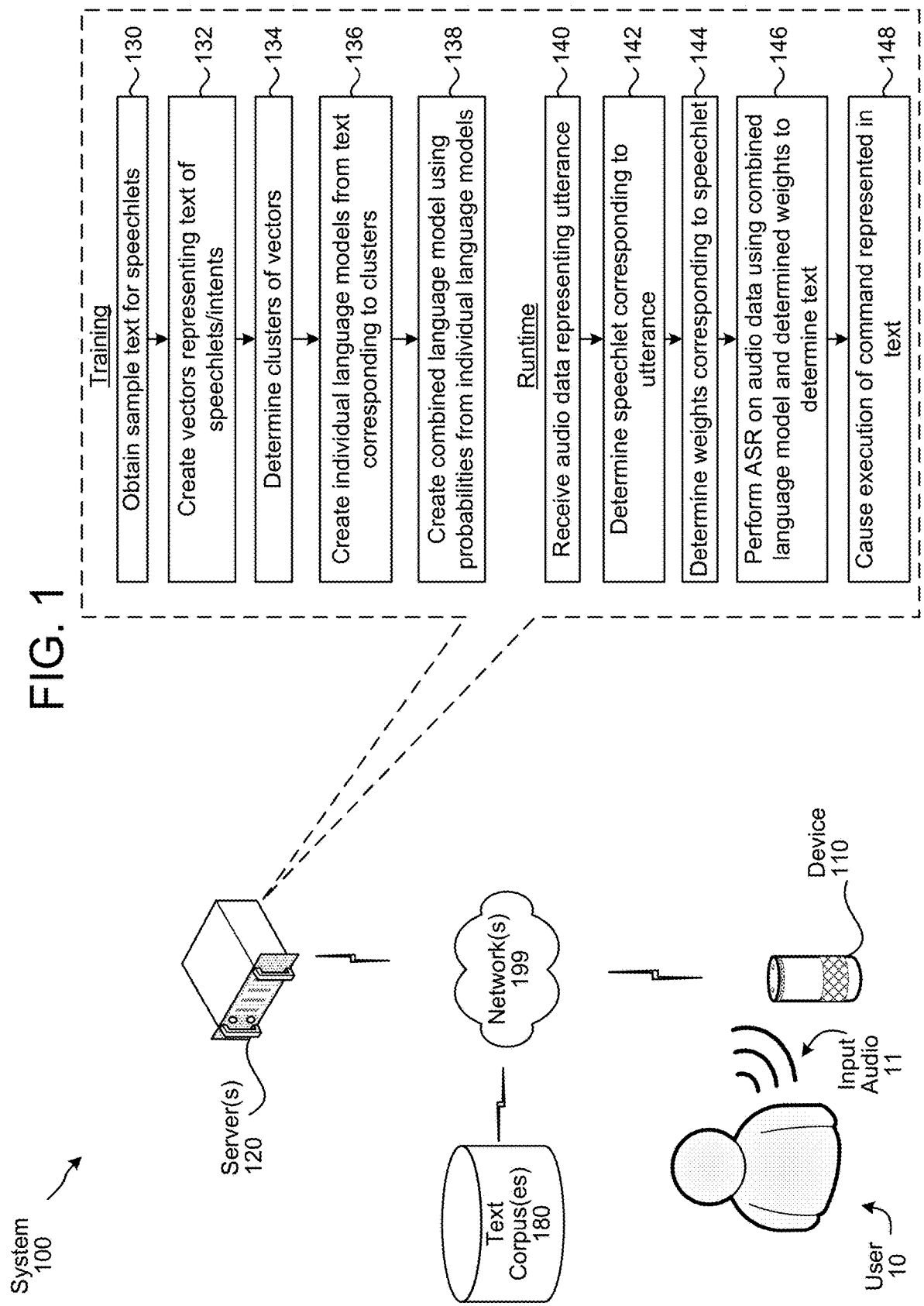
FIG. 1 illustrates a system for creating and using language models according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

ASR and NLU can be computationally expensive. That is, significant computing resources may be needed to process ASR and NLU processing within a reasonable time frame. Because of this, a distributed computing environment may be used to when performing speech processing. An example of such a distributed environment may involve a local device having one or more microphones being configured to capture sounds from a user speaking (e.g., "utterances") and convert those sounds into data (e.g., "an audio signal"). The audio signal/data may then be sent to a downstream remote device for further processing, such as converting the audio signal into an ultimate command. The command may then be executed by a combination of remote and local devices depending on the command itself.

Finite State Transducers (FSTs) and other language models are widely used in ASR systems to encode different knowledge sources used during search. A language model is a model that indicates how likely certain words are used together, as based on many different example sentences and text available to the system. Such language models may encode a representation of how likely such words or word combinations are likely to be used by a speaker, thus assisting an ASR system in determining the likelihood that a certain word was spoken during an utterance being processed. Such language models are used with acoustic models (that are used to determine a likelihood that a certain detected sound corresponds to a particular acoustic unit) to transform audio data into text.

One potential drawback to current language models, in particular FST language models, is that a universe of text samples used to create the language model may not completely represent the different word combinations that may be spoken by a user. Further, typically language models are static and are deployed for ASR purposes with little flexibility for the language model to adapt to different conditions to customize ASR to current conditions (such as customizing ASR based on interaction with a particular skill or application, or other conditions). This may result in undesirable performance at runtime when processing an incoming utterance.

Further, the estimation of statistical language models is dependent on the availability of large amounts of training data. Adapting them to new applications (such as applications that may be launched by a speech-processing system, sometimes called skills or speechlets) with only a handful of in-domain data (e.g., data specific to the particular speechlet) is hard and can lead to over-fitting. Additionally, maintaining a separate language model for each speechlet/application becomes an operational burden when the number of applications runs in thousands. To deal with sparse amounts of application data, offered is a novel method that uses a combination of latent semantic analysis and pre-trained word embeddings to discover effective domains among a set of applications, and create a combined language model using these effective domains. A typical category domain may correspond to a category of applications/speechlets/intents (e.g., weather, music, travel, shopping, banking, etc.). An effective domain may be a grouping of applications/speechlets/intents that use a similar sentence structure/grammar/syntax such that the speechlets of the effective domain may be combined for purposes of creating an individual language model. While one effective domain may include applications of a typical category domain, the effective domain may also include applications across typical domains (and/or may divide applications within a domain depending on their individual syntax, etc.). Multiple different individual language models, each corresponding to the language used with applications within an effective domain, may then be combined to create the combined language model. Instead of a fixed probability or score for a particular portion of the language model (such as for an N-gram, FST arc, or other portion), the combined language model may include a vector of different scores that are configured to be multiplied by particular weights prior to runtime ASR processing. The particular weights applied at runtime may be based on certain characteristics of the runtime conditions such as a particular application, particular user, or the like. The particular weights may then be multiplied by the scores in the vectors to arrive at fixed probabilities/scores for the language model that can be used for runtime ASR processing.

For example, for each application a system may estimate a different set of interpolation weights of the combined language model and perform on-the-fly calculation of language model scores to avoid maintaining a separate per-application language model. Experiments on adapting the combined language model on applications built for voice interactions show up to 25% reduction in perplexity and 15% improvement in recognition accuracy over a general N-gram model. An N-gram is an ordered word sequence of N words long.

FIG. 1 shows a system 100 configured to perform language model construction and/or speech processing using the constructed language models. Although FIG. 1, and lower figures/discussion, illustrate the operation of the system in a particular order, the steps described may be performed in a different order (as well as certain steps removed or added) without departing from the intent of the disclosure. As shown in FIG. 1, a system 100 may include one or more devices 110 local to user(s) 10 (which may be referred to as a local device), as well as one or more networks 199 and one or more servers 120 connected to device 110 across network(s) 199. The server(s) 120 (which may be one or more different physical devices) may be capable of performing traditional speech processing (such as ASR, NLU, query parsing, etc.) as described herein. A single server may be capable of performing all speech processing or multiple server(s) 120 may combine to perform the speech processing. Further, the server(s) 120 may be configured to execute certain commands, such as answering queries spoken by user 10. In addition, certain speech detection or command execution functions may be performed by device 110.

As shown in FIG. 1, during a training period, the system may obtain (130) sample text corresponding to how users interact with particular speechlets and may create (132) vectors representing the text of those speechlets. As described below, the vectors may be created using a number of different techniques including word embeddings, latent semantic analysis, or other techniques. Each vector may correspond to the text for interactions with a particular speechlet or may correspond to the text for interactions with a particular intent. Thus the vectors may be application/speechlet level or intent level as described below. The system may then determine (134) clusters of vectors and may create (136) an individual language model from the text of the speechlets in each respective cluster. Thus a first language model may be created using the text for speechlets in a first cluster, a second language model may be created using the text for speechlets in a second cluster, and so forth. Each such cluster language model will have its own respective probability for portions of the language model. For example, the first language model may have a certain probability corresponding to a particular N-gram, the second language model may have a different probability corresponding to the same N-gram, etc. The system may then create (138) a combined language model where a portion of the combined language model includes all the probabilities from the individual cluster language models. Thus for the same N-gram, the combined language model may store a vector of probabilities associated with the N-gram where the vector includes the certain probability from the first language model, the different probability from the second language model, etc. The combined language model may then be stored for use at runtime.

Then at runtime the system may receive (140) audio data representing an utterance. The system may also determine (142) a speechlet corresponding to the utterance (for example if the utterance is part of an ongoing dialog with a particular speechlet). The system may then determine (144) individual weights corresponding to the speechlet, where the weights represent how closely the speechlet corresponds to the individual cluster language models. The system may then perform (146) automatic speech recognition on the audio data using the combined language model and the determined weights to determine text. The system may do so by multiplying the respective weights by the respective probabilities in portions of the combined language model. For example, the determined weight corresponding to how closely the speechlet corresponds to a first cluster may be used to weight the probabilities in the combined language model that came from the cluster language model of the first cluster and so on. The weighted probabilities may be summed o obtain an adjusted probability for portions of the language model (such as an N-gram) for purposes of ASR processing.

Although FIG. 1 illustrates creating and operating a combined language model based on particular speechlets, other characteristics may also be used such as user identity, user demographic data or affinity, device type, or the like. For other characteristics the system may create vectors representing text corresponding to the particular characteristic, perform clustering and language model construction for the text corresponding to that characteristic (e.g., text corresponding to utterances from users having a particular demographic profile). The system may then create a combined language model using the individual language models corresponding to the individual characteristics. At runtime the system may determine a characteristic of the utterance (e.g., demographic information of the speaking user), may determine how closely that characteristic correlates to the individual characteristic clusters used to create the individual language models, and use those respective correlations to determine weights that will be used to weight the probabilities in the combined language model. In this manner the system may use any characteristic as a substitute for speechlet to create and operate a combined language model using the techniques herein.

Figure 2:
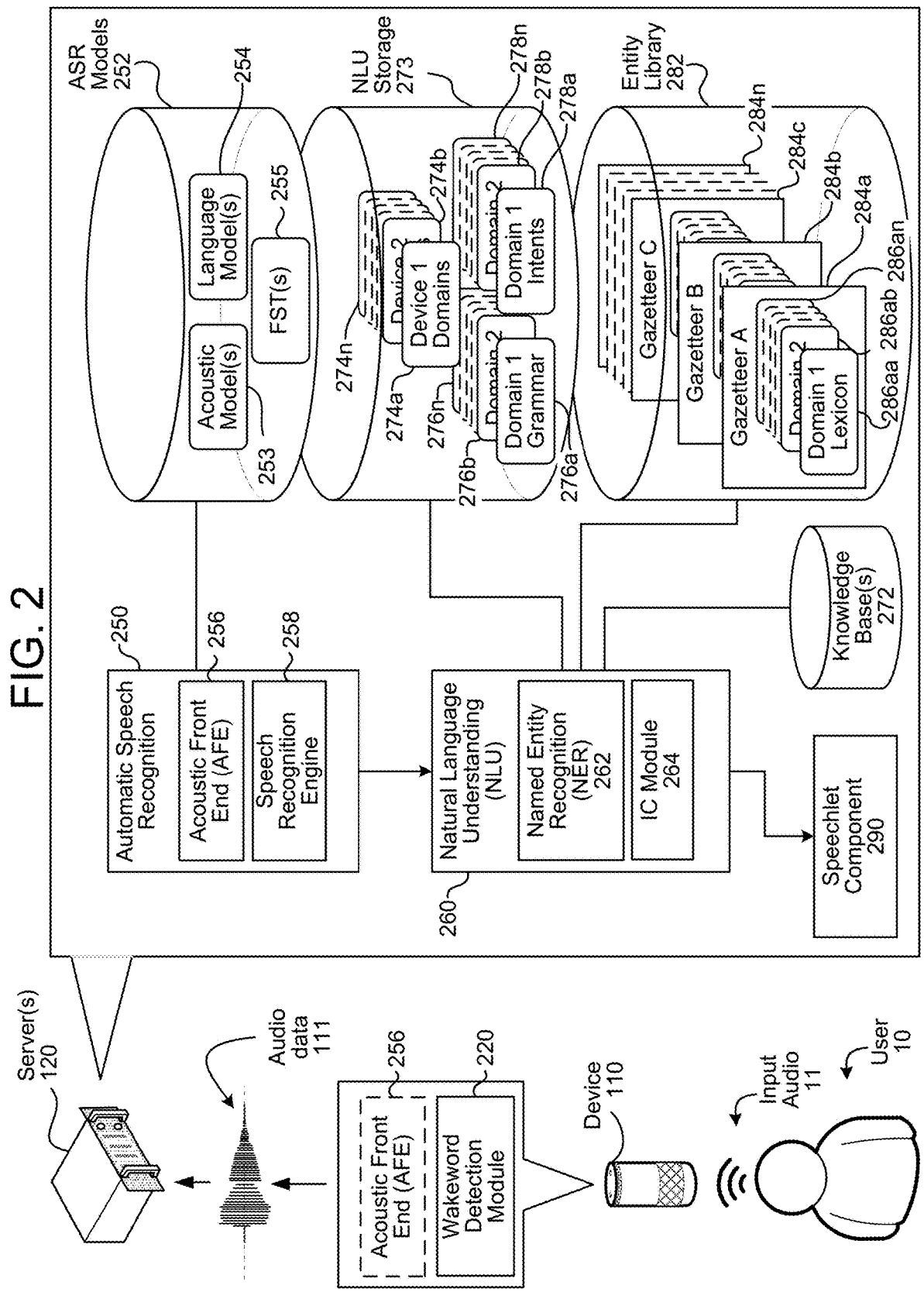
FIG. 2 is a conceptual diagram of a speech processing system according to embodiments of the present disclosure.

Further details are discussed below, following a discussion of the overall speech processing system of FIG. 2. FIG. 2 is a conceptual diagram of how a spoken utterance is traditionally processed, allowing a system to capture and execute commands spoken by a user, such as spoken commands that may follow a wakeword. The various components illustrated may be located on a same or different physical devices. Communication between various components illustrated in FIG. 2 may occur directly or across a network 199. An audio capture component, such as a microphone of device 110, captures audio 11 corresponding to a spoken utterance. The device 110, using a wakeword detection module 220, then processes the audio, or audio data corresponding to the audio, to determine if a keyword (such as a wakeword) is detected in the audio. Following detection of a wakeword, the device sends audio data 111 corresponding to the utterance, to a server 120 that includes an ASR module 250. The audio data 111 may be output from an acoustic front end (AFE) 256 located on the device 110 prior to transmission. Or the audio data 111 may be in a different form for processing by a remote AFE 256, such as the AFE 256 located with the ASR module 250.

The wakeword detection module 220 works in conjunction with other components of the device, for example a microphone (not pictured) to detect keywords in audio 11. For example, the device 110 may convert audio 11 into audio data, and process the audio data with the wakeword detection module 220 to determine whether speech is detected, and if so, if the audio data comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM), Gaussian Mixture Model (GMM) or Deep Neural Network (DNN) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the device 110 (or separately from speech detection), the device 110 may use the wakeword detection module 220 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting uses hidden Markov models (HMM) for each key wakeword word and non-wakeword speech signals respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 110 may "wake" and begin transmitting audio data 111 corresponding to input audio 11 to the server(s) 120 for speech processing. Audio data corresponding to that audio may be sent to a server 120 for routing to a recipient device or may be sent to the server for speech processing for interpretation of the included speech (either for purposes of enabling voice-communications and/or for purposes of executing a command in the speech). The audio data 111 may include data corresponding to the wakeword, or the portion of the audio data corresponding to the wakeword may be removed by the local device 110 prior to sending. Further, a local device 110 may "wake" upon detection of speech/spoken audio above a threshold, as described herein. Upon receipt by the server(s) 120, an ASR module 250 may convert the audio data 111 into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model storage 252c. For example, the ASR process may compare the input audio data with models for sounds (e.g., subword units or phonemes) and sequences of sounds to identify words that match the sequence of sounds spoken in the utterance of the audio data. Alternatively, the ASR process may use a finite state transducer (FST) 255 to implement the language model functions, as explained below.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 256 and a ASR engine 258. The acoustic front end (AFE) 256 transforms the audio data from the microphone into data for processing by the speech recognition engine. The ASR engine 258 compares the speech recognition data with acoustic models 253, language models 254, FST 255, and/or other data models and information for recognizing the speech conveyed in the audio data. The AFE may reduce noise in the audio data and divide the digitized audio data into frames representing a time intervals for which the AFE determines a number of values, called features, representing the qualities of the audio data, along with a set of those values, called a feature vector, representing the features/qualities of the audio data within the frame. Typically audio frames may be 10 ms each. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The ASR engine 258 may process the output from the AFE 256 with reference to information stored in speech/model storage (252). Alternatively, post front-end processed data (such as feature vectors) may be received by the device executing ASR processing from another source besides the internal AFE. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the ASR engine 258.

The ASR engine 258 attempts to match received feature vectors to language phonemes and words as known in the stored acoustic models 253, language models 254, and FST 255. The ASR engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The ASR engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using finite state transducers (FSTs) explained below, may also be used.

Following ASR processing, the ASR results may be sent by the ASR engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as server 120, for natural language understanding (NLU) processing, such as conversion of the text into commands for execution, either by the device 110, by the server 120, or by another device (such as a server running a specific application like a search engine, etc.).

The device performing NLU processing 260 (e.g., server 120) may include various components, including potentially dedicated processor(s), memory, storage, etc. A device configured for NLU processing may include a named entity recognition (NER) module 252 and intent classification (IC) module 264, NLU storage 273, and a knowledge base 272. The NLU process may also utilize gazetteer information (284a-284n) stored in entity library storage 282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process takes textual input (such as processed from ASR 250 based on the utterance 11) and attempts to make a semantic interpretation of the text. That is, the NLU process determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list), the NLU may process all N outputs to obtain NLU results.

The NLU process may be configured to parse and tag text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result). Thus, certain data may be associated with the word "call" indicating that it corresponds to a command and other data may be associated with the word "mom" indicating that it corresponds to an entity.

To correctly perform NLU processing of speech input, the NLU process 260 may be configured to determine a "domain" (e.g., a category domain or an effective domain as discussed above) of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition module 262 receives a query in the form of ASR results and attempts to identify relevant grammars and lexical information that may be used to construe meaning. To do so, a name entity recognition module 262 may begin by identifying potential domains that may relate to the received query. The NLU storage 273 includes a databases of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

A category domain may represent a discrete set of activities having a common theme, such as "shopping", "music", "calendaring", etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

A query is processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result.

An intent classification (IC) module 264 parses the utterance text to determine an intent or intents for each identified domain. An intent corresponds to the desired action to be performed that is responsive to the utterance. Each domain is associated with a database (278a-278n) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 260 may parse the query to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 260 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones," but based on grammar rules and models, it is determined that these phrase relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the a slot/field using gazetteer information, the NER module 262 may search the database of generic words associated with the domain (in the NLU's storage 273). So for instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried (either serially or in parallel), potentially producing two different results.

The comparison process used by the NER module 262 may classify (e.g., score) how closely a database entry compares to a tagged query word or phrase, how closely the grammatical structure of the query corresponds to the applied grammatical framework, and based on whether the database indicates a relationship between an entry and information identified to fill other slots of the framework.

The NER modules 262 may also use contextual operational rules to fill slots. For example, if a user had previously requested to pause a particular song and thereafter requested that the voice-controlled device to "please un-pause my music," the NER module 262 may apply an inference-based rule to fill a slot associated with the name of the song that the user currently wishes to play—namely the song that was playing at the time that the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a speechlet component 290, which may be located on a same or separate server 120 as part of system 100. The destination speechlet component 290 may be determined based on the NLU output. For example, if the NLU output includes a command to play music, the destination speechlet component 290 may be a music playing speechlet, such as one located on device 110 or in a music playing appliance, configured to execute a music playing command. If the NLU output includes a search request, the destination speechlet 290 may include a search engine speechlet, such as one located on a search server, configured to execute a search command.

Thus, the output from the NLU component 260 (which may include tagged text data, indicators of intent, etc.) may then be sent to a speechlet(s) 290. A "speechlet" may be software running on the server(s) 120 that is akin to a software application running on a traditional computing device. That is, a speechlet 290 may enable the server(s) 120 to execute specific functionality in order to provide data or produce some other requested output. The server(s) 120 may be configured with more than one speechlet 290. For example, a weather service speechlet may enable the server(s) 120 to provide weather information, a car service speechlet may enable the server(s) 120 to book a trip with respect to a taxi or ride sharing service, an order pizza speechlet may enable the server(s) 120 to order a pizza with respect to a restaurant's online ordering system, a communications speechlet may enable the system to perform messaging or multi-endpoint communications, a Q&A speechlet may enable the server(s) 120 to provide various Q&A information, etc. A speechlet 290 may operate in conjunction between the server(s) 120 and other devices such as a device 110 in order to complete certain functions. Inputs to a speechlet 290 may come from speech processing interactions or through other interactions or input sources.

A speechlet 290 may include hardware, software, firmware, or the like that may be dedicated to a particular speechlet 290 or shared among different speechlets 290. A speechlet 290 may be part of the server(s) 120 (as illustrated in FIG. 2) or may be located at whole (or in part) with separate speechlet servers (not illustrated). A speechlet server(s) may communicate with a speechlet(s) 290 within the server(s) 120 and/or directly with the orchestrator component 230 or with other components. Unless expressly stated otherwise, reference to a speechlet, speechlet device, or speechlet component may include a speechlet component operating within the server(s) 120 (for example as speechlet 290) and/or speechlet component operating within a speechlet server(s).

A speechlet 290 may be configured to perform one or more actions. An ability to perform such action(s) may sometimes be referred to as a "skill." That is, a skill may enable a speechlet 290 to execute specific functionality in order to provide data or perform some other action requested by a user. A particular speechlet 290 may be configured to execute more than one skill/action. For example, a weather service skill may involve a weather speechlet providing weather information to the server(s) 120, a car service skill may involve a car service speechlet booking a trip with respect to a taxi or ride sharing service, an order pizza skill may involve a restaurant speechlet ordering a pizza with respect to a restaurant's online ordering system, etc.

A speechlet 290 may be in communication with one or more speechlet servers implementing different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, as well as custom skills that are not associated with any pre-configured type of skill.

In certain instances, a speechlet 290 may output data in a form suitable for output to a user (e.g., via a device 110). In other instances, a speechlet 290 may output data in a form unsuitable for output to a user. Such an instance includes a speechlet 290 providing text data while audio data is suitable for output to a user. Unless stated otherwise, the terms skill, speechlet and application may be used interchangeably herein.

As discussed above, during ASR processing the ASR engine 258 attempts to match received feature vectors to words or subword units. A subword unit may be a phoneme, phoneme in context, syllable, part of a syllable, syllable in context, or any other such portion of a word. The ASR engine 258 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR module outputs speech results that make sense grammatically.

The ASR engine 258 may use a number of techniques to match feature vectors to phonemes or other phonetic units, such as biphones, triphones, etc. One common technique is using Hidden Markov Models (HMMs). HMMs are used to determine probabilities that feature vectors may match phonemes. Using HMMs, a number of states are presented, in which the states together represent a potential phoneme (or other speech unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the ASR engine 258, the state may change or stay the same, based on the processing of the new feature vectors. A Viterbi algorithm may be used to find the most likely sequence of states based on the processed feature vectors.

In one example, the ASR engine 258 may receive a series of feature vectors for sound corresponding to a user saying "There is a bat in my car." The ASR engine 258 may attempt to match each feature vector with a phoneme. As new feature vectors are processed, the ASR engine 258 may determine state transitions (for example, using HMMs) to determine whether a probability of whether a state should either remain the same, or change to a new state, i.e., whether an incoming feature vector results in a state transition from one phone to another. As the processing continues, the ASR engine 258 continues calculating such state transition probabilities. After processing one feature vector, the speech recognition may move to the next feature vector.

Probabilities and states may be calculated using a number of techniques. For example, probabilities for each state may be calculated using a Gaussian model, Gaussian mixture model, or other technique based on the feature vectors. Techniques such as maximum likelihood estimation (MLE) may be used to estimate the probability of phoneme states.

In addition to calculating potential states for one phoneme as a potential match to a feature vector, the ASR engine 258 may also calculate potential states for other phonemes. In this manner multiple states and state transition probabilities may be calculated.

The probable states and probable state transitions calculated by the ASR engine 258 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. When combining scores as part of the ASR processing, scores may be multiplied together (or combined in other ways) to reach a desired combined score or probabilities may be converted to the log domain and added to assist processing.

The ASR engine 258 may also compute scores of branches of the paths based on language models or grammars. Language modeling involves determining scores for what words are likely to be used together to form coherent words and sentences. Application of a language model may improve the likelihood that the ASR module 250 correctly interprets the speech contained in the audio data. For example, acoustic model processing returning the potential phoneme paths of "B A T", "B A D", and "B E D" may be adjusted by a language model to adjust the recognition scores of "B A T" (interpreted as the word "bat"), "B A D" (interpreted as the word "bad"), and "B E D" (interpreted as the word "bed") based on the language context of each word within the spoken utterance. The language modeling may be determined from a text corpus and may be customized for particular applications.

Figure 3:
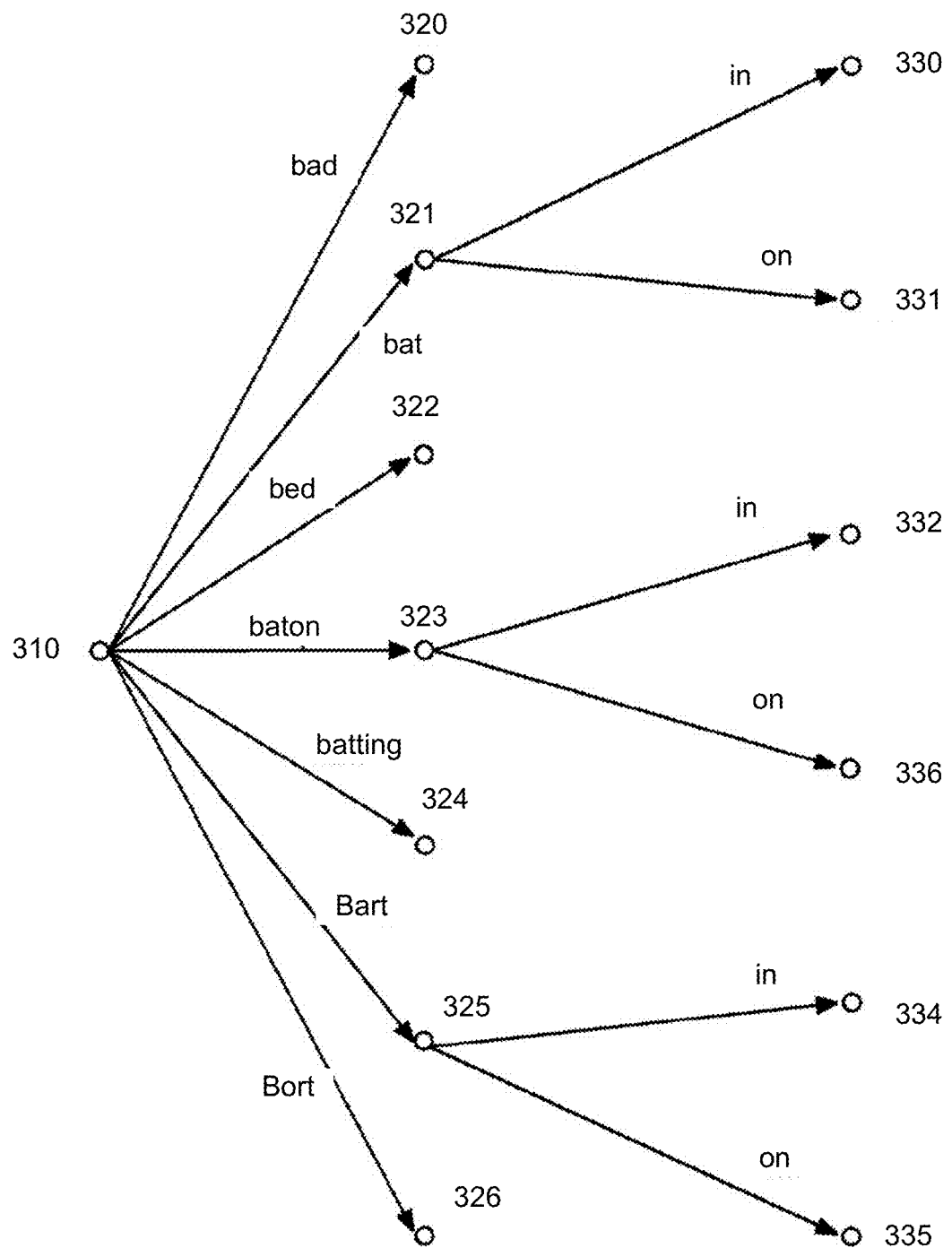
FIG. 3 illustrates a word result network according to embodiments of the present disclosure.

As the ASR engine 258 determines potential words from the input audio the lattice may become very large as many potential sounds and words are considered as potential matches for the input audio. The potential matches may be illustrated as a word result network representing possible sequences of words that may be recognized and the likelihood of each sequence. FIG. 3 shows an example of a word result network that may be used by a ASR engine 258 for recognizing speech according to some aspects of the present disclosure. A word result network may consist of sequences of words that may be recognized and the likelihood of each sequence. The likelihood of any path in the word result network may be determined by an acoustic model and a language model. In FIG. 3, the paths shown include, for example, "bad", "bat in", "bat on", "bed", "baton in", "baton on", "'batting", "Bart in", "Bart on", and "Bort".

As illustrated in FIG. 3, a word result network may start at initial node 310. At node 310, no words may have been recognized yet as the ASR engine 258 commences its processing. From node 310, the ASR engine 258 may create arcs and additional nodes where each arc may be associated with a potential word that may be recognized. In some applications, words may be represented by nodes instead of arcs. In FIG. 3, arcs from node 310 to nodes 320 to 326 are labeled with example words that may be recognized by the ASR engine 258.

From initial node 310, the ASR engine 258 may apply acoustic and language models to determine which of the arcs leaving node 310 are most likely to occur. For an acoustic model employing HMMs, ASR engine 258 may create a separate MINI for each arc leaving node 310. Applying the acoustic and language models the ASR engine 258 may decide to pursue some subset of the arcs leaving node 310. For example, in FIG. 3, the ASR engine 258 may decide to follow the paths starting with "bad", "bat", and "bed" and may decide to stop pursuing the paths starting with "baton", "batting", "Bart," and "Bort" based on the respective scores of those arc, with the ASR engine 258 pursuing only the higher scoring arcs in an effort to concentrate computing resources on the arcs most likely to result in a correct result.

The ASR engine 258 may return an N-best list of paths along with their respective recognition scores, corresponding to the top N paths as determined by the ASR engine 258. An application (such as a program or component either internal or external to the ASR device 302) that receives the N-best list may then perform further operations or analysis on the list given the list and the associated recognition scores. For example, the N-best list may be used in correcting errors and training various options and processing conditions of the ASR module 250. The ASR engine 258 may compare the actual correct utterance with the best result and with other results on the N-best list to determine why incorrect recognitions received certain recognition scores. The ASR engine 258 may correct its approach (and may update information in the ASR models 252) to reduce the recognition scores of incorrect approaches in future processing attempts.

In one aspect of the disclosure, the ASR engine 258 may use a finite state transducer (FST) to perform speech recognition. An FST is a graph that may include all possible words that may be recognized by the ASR engine 258. While the word result network of FIG. 3 may be created dynamically to recognize words, an FST may be static in that it is created in advance and the same FST may be used for the recognition of all utterances.

An FST may include paths for all sequences of words that may be recognized. The creation of an FST may be visualized by starting with the word result network of FIG. 3. The word result network of FIG. 3 may be built out to include all possible utterances that could be recognized by the ASR engine 258. Such a word result network would be potentially unbounded in size unless there was a limitation on the length of utterances that could be recognized. If the lexicon consisted of 100,000 words, there may be 100,000 arcs leaving the initial node of the node of the word result network. For each of the initial words, there may be 100,000 words that could follow. Thus, after only two words, there may be as many as 10 billion paths through the word result network. As utterances of three or more words are included, the size of the word result network will grow considerably larger.

An FST may allow for the recognition of all the words in the above word result network, but may do so with a graph that is smaller than the word result network. An FST may be smaller because it may have cycles and/or it may be determined and/or minimized. An FST may be determined if, for each node in the FST, each arc exiting the node has a different label. An FST may be minimized if it has the minimum number of possible nodes. For example, depending on the application, a given word may appear only once in an FST, and an FST may be cyclical so that a given arc of the FST may be traversed more than once for a single utterance. For other applications, words may appear in an FST more than once so that that context of the word may be distinguished. Although the above example considered an FST of words, an FST may represent sequences of other types, such as sequences of HIVIMs or HMM states. A larger FST may be creating by composing other FSTs. For example, an FST that includes words and phones may be created by composing an FST of words with an FST of phones.

In certain aspects, different finite state transducers (FSTs) are used for different speech processing tasks. One FST may be used for Hidden Markov Model (HMM) operations to input model temporal dynamics of speech such as phone duration (referred to as an "H" FST). Another FST may be used to model phonotactic context dependency (referred to as a "C" FST). Another FST may be the language FST used to map sequences of phones to words (referred to as an "L" FST). Finally, another FST, known as the grammar, models individual words to sequences of words that are likely to be used together (referred to as a "G" FST). Thus, the H FST transduces an audio feature vectors (corresponding to audio frames) into context dependent phones, the C FST enforces usage constraints and transduces context dependent phones to context independent phones, the L FST transduces context independent phones to words and the G FST transduces words to words that are likely to make sense together, as according to a language model.

In certain situations certain operations may be grouped into a large FST that incorporates the different operations such as an HCLG FST that incorporates all of the above operations, thus yielding a final search graph that is the composition of the above FSTs. In other situations the operations are grouped differently, where one FST is an HCL FST and another FST is a G FST. This configuration may be useful for domain-specific or user-specific (or other customized) grammars (i.e., G FSTs) that can be swapped in or out for different incoming speech requests, and paired with an existing HCL FST to obtain desired speech results. A user-customized FST may be created by capturing information about how a user interacts with a voice-controlled system and noting what words are typically spoken by a user to a device. The system may then customize an FST by weighting more heavily word sequences frequently spoken by a user and/or including user-favored words in an FST that may otherwise not be included. Further, a domain specific language model may be configured based on the words that may be expected for a particular domain.

An FST may be constructed based on the text corpus 180 that includes a large amount of text representing sentences that may be spoken by users. The FST is thus constructed so that it may represent a large number (though not necessarily infinite) number of potential sentences that may be spoken. The FST may be sufficiently granular, however, that each state may represent a particular acoustic unit (such as a senon, phoneme, etc.). Thus, each state of the FST may represent a portion in the progression of potential incoming sounds and how those sounds relate to spoken words. As incoming feature vectors corresponding to audio frames are processed by the ASR engine 258, it may travel from state to state along arcs of the FST. States/arcs that are traversed (and not pruned) are preserved to form a lattice. As each state of the FST is processed by a ASR engine 258, the engine 258 may keep track of the information associated with that portion of the FST (represented by outgoing labels on the arcs between FST states) to build the likely ASR result. Thus, words corresponding to traversed outgoing arcs may be used to construct the lattice, and from the lattice an N best list of potential ASR results.

The FST is thus a directed graph where each arc has certain properties such as input labels, output labels, a score associated with each arc, and an end state where the arc leads. As feature vectors for audio frames are processed by the ASR engine 258, it may traverse the FST to form a lattice representing potential speech recognition results, where the lattice is made up of nodes and/or arcs of the FST that, after traversal by the ASR engine 258, have satisfied the pruning thresholds to be maintained and not discarded. A lattice may also be formed using the acoustic models and language model described above. In the context of an FST, as the ASR engine 258 traverses through states in the FST, it may assign a score to each state or arc on the FST. After traversing an arc, the score of the arc of the FST, the score of the arc may be added to the total cost of the path leading to that arc. To save computational resources, the ASR engine 258 may prune and discard low recognition score states or paths that have little likelihood of corresponding to the spoken utterance, either due to low recognition scores, or for other reasons. Thus, a certain number of states may be preserved for each frame, and those states may be connected to states associated with the next frame (that survived a pruning), thus ultimately resulting in multiple paths through the FST representing potential speech recognition results. These multiple paths may be represented by the lattice, such as the lattice of FIG. 5, discussed below. After traversing the FST, the path with the best score (which may be the highest score or lowest score depending on the configuration of the FST) may be selected as the most likely path.

FIGS. 4A-4D illustrate different a small section of an ASR FST. In particular, FIGS. 4A-4D a small portion of an FST that may be traversed when processing audio data representing speech and determining whether that audio data corresponds to the word "bat" or the word "bad." The FST portion shows a single start state (state 0 shown in FIG. 4A) and multiple end states (states 62, 68, 69, 81, 82, and 83, shown in FIGS. 4C and 4D). In a full FST for speech processing there may be one or multiple start states and many more end states. Further, the end states may be located at various locations throughout the FST to represent different potential end portions that may be received by a potential utterance.

As can be seen in FIGS. 4A-4D, each state has one or more arcs outgoing from it that lead from the particular state to the next state. Each arc is associated with an input label, an output label and a score, shown in the figures as [input label]:[output label]/[score]. Thus, for example, arc 402 outgoing from state 0 to state 2 has an input label of 10, an output label of <eps> (explained below) and a score of 0.15137. The scores illustrated in FIGS. 4A-4D the scores represent scores or "costs" of each arc, where a lower scoring arc represents an arc that is more likely to be traversed/chosen than a higher scoring arc. In the present illustration of FIGS. 4A-4D, the illustrated scores roughly correspond to the negative logarithm of the probability the particular arc may be traversed, but multiple scoring configurations are possible. Further, the scores illustrated in FIGS. 4A-4D represent scores of the arcs in the FST prior to ASR processing. During processing, those scores will be adjusted using the scores of the acoustic model, as explained below. Although the scores illustrated represent one way of scoring arcs, other techniques may also be used. Further, while lower scores illustrated in FIGS. 4A-4D are considered "better," as in, more likely to be selected during ASR, in other configurations higher scores may be considered more likely to be selected.

As noted below, the input labels and output labels of an arc in an FST may include pointers to tables that track the individual labels. Further, for an ASR FST such as that illustrated in FIGS. 4A-4D, the input labels may correspond to individual acoustic speech units such as phonemes or senons or portions thereof. A senon is a grouping of HMM states which represents a particular grouping of phones as may be used together in speech. Each phone may have a number of incrementally different sounds depending on its context (e.g., the surrounding phones). While English may have approximately 50 phones it has several thousand sound groupings represented by senons. Use of senons in ASR processing may allow for improved ASR results. Thus, for example, arc 402 outgoing from state 0 in FIG. 4A has an input label of 10. That may correspond to entry 10 of an input label table, which in term may correspond to a particular phoneme or portion thereof, for example corresponding to a beginning of a "b" sound as might be spoken in "bat." Further remaining input labels on arcs outgoing from state 0 (4 in arc 404 from state 0 to state 3, 5480 in arc 406 outgoing from state 0 to state 5, 16 in arc 408 outgoing from state 0 to state 1, and 2 in arc 410 outgoing from state 0 to state 4) may each represent different acoustic units that may be identified by an acoustic model. In the example of the figures, these input labels may also correspond to different speech units that represent different ways of making a "b" sound. As the FST is traversed during ASR (explained below), the system may use the input labels to determine how to traverse the FST (based on the output from the acoustic model).

The output labels of the arcs may be collected by the ASR engine 258 for eventual use in outputting ASR results. As can be appreciated by FIGS. 4A-4D, however, many arcs have a label <eps> (either as input label or as output label) which represents the label epsilon (E). Epsilon is representative of a null label. That is, arcs with <eps> as an output label, have no output label and thus do not contribute any words to a potential ASR result. Arcs with <eps> as an input label do not need acoustic input to be traversed, and thus may be traversed as part of ASR processing without a new input audio feature vector. For example, if the ASR engine 258 reaches state 10, it may traverse arc 430 from state 10 to state 15 as there is no input label on that arc that refers to an indexed acoustic unit. The ASR engine 258, however, will not traverse arc 432 outgoing from state 15 until a new audio feature vector is processed, as arc 432 has an input label of 5570, which refers to an acoustic unit, thus requiring a new audio feature vector be processed before arc 432 is traversed.

Figure 4A:
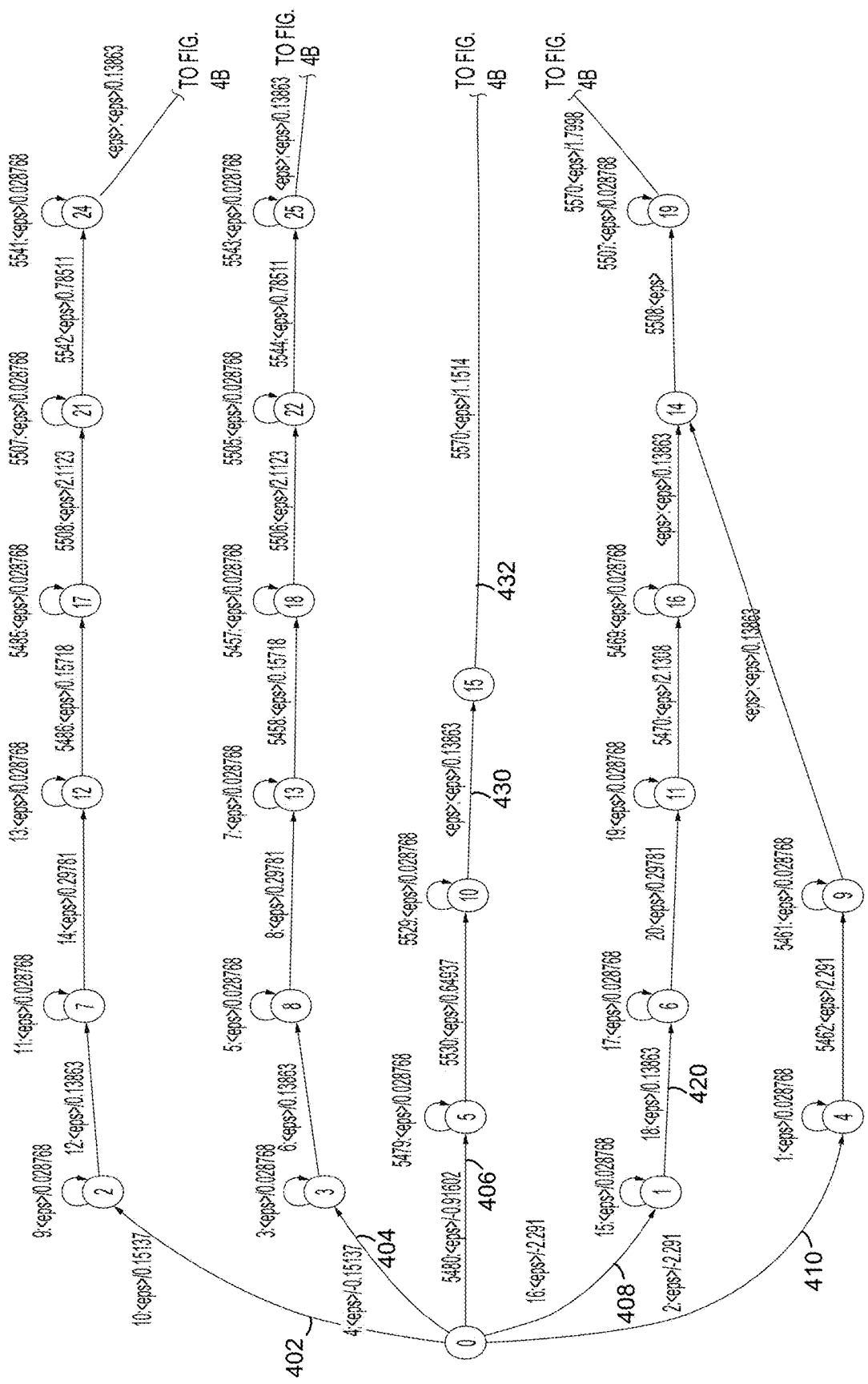
Figure 4B:
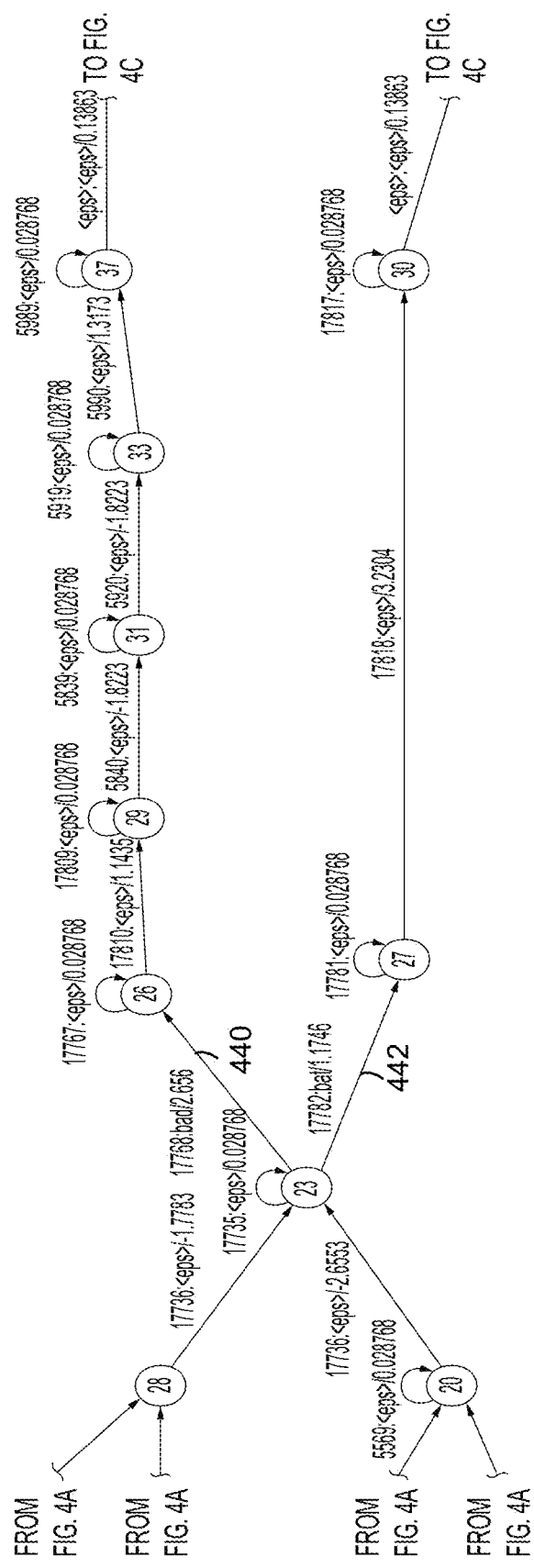
Figure 4C:
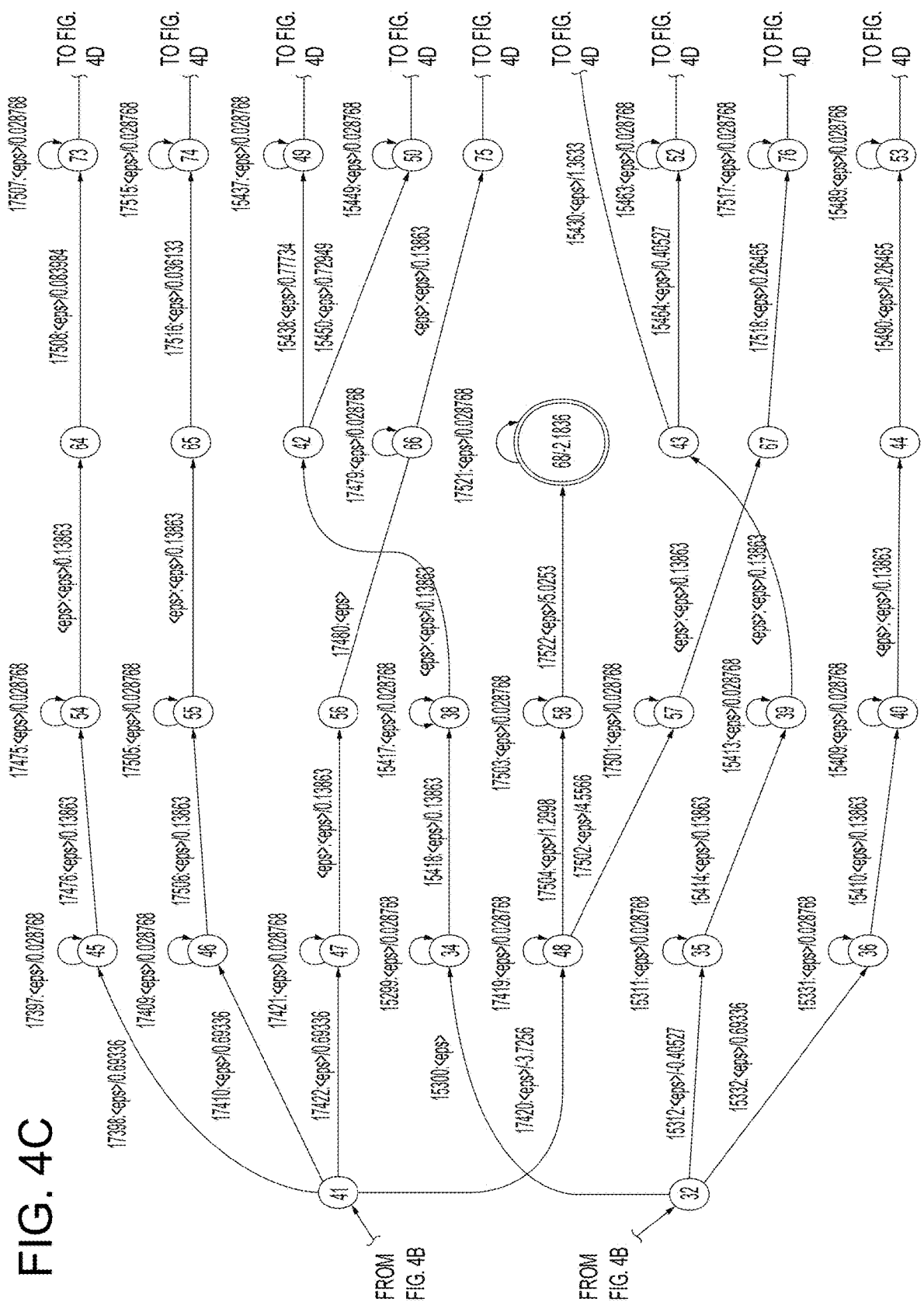

Only certain portions of an FST have an output label. For example, as shown in FIG. 4B, only arcs 440 and 442 have an output label. Arc 440, from state 23 to state 26 has an output label of "bad" and arc 442 from state 23 to state 27 has an output label of "bat." Because the FST portion of FIGS. 4A-4D only illustrate choosing between the words "bad" and "bat", the output labels corresponding to "bad" and "bat" are located at the point in the illustrated FST portion branches between the two words. Thus, only after the speech recognition system 258 has traversed those particular arcs (which can only be reached if the system traverses the arcs before), will the speech recognition system 258 output either the word "bat" or the word "bad" (with a corresponding score) from the FST. As can be appreciated, many states and arcs may be traversed before a word is output using an FST during ASR. This logically follows from the understanding that certain states of an FST may be correspond to a single audio frame, and an audio frame may be only 10 ms long. Thus many frames (and states) need to be processed before a word may be recognized.

Although an FST is a graphical construct as shown in FIGS. 4A-4D, when stored as data in the system, an FST may be represented as data in two or more tables. The two tables include a table of states (also called nodes) and a table of arcs. The FST may optionally include a table of input labels and a table of output labels for particular arcs, though those label tables may be stored separately (and thus not be considered part of) the FST. Though this is configurable. As an example, the state/node table may contain a record for each state/node, with each state record consisting of the following four fields:

(1) Final score of the state,
(2) Offset in the arc array pointing to the beginning of the list of arcs outgoing from the state,
(3) Number of outgoing arcs with epsilon (E) input label, and
(4) Number of outgoing arcs with epsilon (E) output label.

Each of these fields may be represented by a particular N-bit integer (e.g., 16, 32, etc.). The integer size for a particular field may be different from that of a different field.

Thus, to represent a state with may outgoing arcs (for example, state 0 in FIG. 4A) the table entry for state 0 would include a final score of state 0, a pointer to the arc table corresponding to an arc table entry for a first arc outgoing from state 0 (for example 402), a number of outgoing arcs from state 0 with a null epsilon input label and a number of outgoing arcs from state 0 with a null epsilon input label. As FIG. 4A is an incomplete portion of an FST, it does not illustrate all the arcs from state 0 and thus does not show all the arcs containing an epsilon label. Although the entry for state 0 may only include a pointer to a first outgoing arc from state 0, the arc table and state table may be organized so that the entry in the state table for the next state, e.g., state 1, includes a pointer to the arc table for the first outgoing state from state 1, e.g., arc 420. The system may thus determine that any arcs from 402 up to, but not including 420, are outgoing from state 0.

The arcs table may contain the following information for each arc:

(1) Arc score, (2) Next state ID (the end point of the arc)

(3) Input label (which may be a pointer to a label in a table of input labels)

(4) Output label (which may be a pointer to a label in a table of output labels)

Each of these fields may be represented by a particular N-bit integer. The integer size for a particular field may be different from that of a different field. Thus, to represent a particular arc, for example arc 420, the entry in the arc table may include an arc score (e.g., 0.13863), the next state ID for the arc (e.g., state 6), the input label (e.g., a pointer in a table of input labels to input label 18, which may correspond to a particular acoustic unit), and the output label (which is epsilon and thus may be blank, or set to a particular value that represents epsilon, or may point to an entry in the table of output labels that represents epsilon).

During runtime ASR processing, the ASR engine 258 may take incoming audio feature vectors corresponding to audio frames and may process them with an acoustic model 253. For each processed feature vector, the acoustic model processing will then result in acoustic model output including a list of potential acoustic units corresponding to the feature vector along with a corresponding list of acoustic scores for the respective potential acoustic units. The ASR engine 258 will then identify those acoustic units in the input labels of particular states currently under consideration at the FST and will rescore the arcs associated with those acoustic units using both the acoustic scores and the scores of the arcs built into the FST.

Take, for example, state 0 of FIG. 4A as an active state being considered as part of ASR processing. An incoming feature vector is received by the system and processed by the ASR engine 258 using acoustic model 253. The output of that processing may give certain scores for the acoustic units represented in the input labels of the arcs outgoing from state 0, for example:

unit 10, acoustic score $s_1$
unit 4, acoustic score $s_2$
unit 5480, acoustic score $s_3$
unit 16, acoustic score $s_4$
unit 2, acoustic score $s_5$ The ASR engine 258 may then take acoustic score $s_1$ and use it to adjust the existing score (0.84451) of arc 402 (which corresponds to unit 10). The scores may be added together, multiplied, or any other technique of combination. The resulting combined score may then be maintained by the system as the processed score corresponding to arc 402. The same process may be performed for each of the arcs outgoing from state 0 (as each of them have an input label corresponding to an acoustic unit) based on the scores corresponding to the acoustic units of their respective input labels, thus resulting in:

Updated score for 402=0.84451+($s_1$*sf)
Updated score for 404=0.84451+($s_2$*sf)
Updated score for 406=−0.22287+($s_3$*sf)
Updated score for 408=−1.5979+($s_4$*sf)
Updated score for 410=−1.5979+($s_5$*sf)

where sf is a scaling factor configured to adjust the acoustic scores so that they can be added to the scores of the FST. The scaling factor may be based on the particular acoustic model and/or FST. The same scaling factor may also be used to adjust each of the acoustic scores.

The destination states for the arcs processed (for example, states 1-5), may then be held in memory while the ASR engine 258 processes the next incoming feature vector corresponding to the next audio frame. The above process will then be repeated, so the acoustic model processing will output acoustic units with corresponding scores, the engine 258 will identify the corresponding units in input labels in arcs outgoing from FST states under consideration by the engine 258, the combines scores will be determined and stored. The process will continue in this manner for all input audio.

As the ASR engine 258 traverses the FST it will continue traversing states and arcs until it reaches a state with an outgoing arc, where the outgoing arc includes an input label corresponding to an acoustic which, which thus means the arc requires new information from the acoustic model to be traversed. For example, the ASR engine 258 may continue to traverse arcs until it arrives at an arc that has an input label corresponding to an acoustic unit. The ASR engine 258 will then wait for the next feature vector to be processed and for further input to come from the acoustic model until it continues processing. In this manner the ASR engine will perform time-synchronous decoding and will only consider portions of the FST in a frame-by-frame manner. That is, all the portions of the FST being processed at a particular time will all correspond to the same input audio frame/feature vector.

Further, as the ASR engine 258 traverses the FST, it may accumulate the combined scores for each path of the traversed nodes and/or arcs traversed up to each point in the FST. The combined score may be a sum of the updated scores (i.e., post acoustic model scores) of each state and/or arc traversed. For example, referring to the portion of the FST shown in FIG. 4A, if the ASR engine 258 has traversed along five paths to the point where it is currently at states 7, 8, 10, 6 and 9, each path will have a combined score leading up to the that point in the path. That is, the combined score for path 1 (currently at state 7) will be the summed updated scores for the nodes and arcs leading from state 0 to state 7, the combined score for path 2 (currently at state 8) will be the summed updated scores for the nodes and arcs leading from state 0 to state 8, the combined score for path 3 (currently at state 10) will be the summed updated scores for the nodes and arcs leading from state 0 to state 10, the combined score for path 4 (currently at state 6) will be the summed updated scores for the nodes and arcs leading from state 0 to state 6, and the combined score for path 5 (currently at state 9) will be the summed updated scores for the nodes and arcs leading from state 0 to state 9.

As the ASR engine 258 operates, there are certain pruning settings that affect how many states the ASR engine 258 may consider. One such pruning setting is the beam width. The beam width is a measurement of the score difference between a best scoring state (corresponding to the particular audio frame being processed) and the cutoff point.

When the ASR engine 258 has completed processing for a particular feature vector, that is the ASR engine 258 has processed the output from the acoustic model for the feature vector and rescored all the arcs and states corresponding to the acoustic units/scores output by the acoustic model (while discarding those that fall outside the beam width), there may be a certain number of states left within the beam that have received their combined scores. (Though note that not every state/arc will receive a combined score, only those that correspond to acoustic units seen by the AM will receive a combined score.) As the ASR engine 258 will continue to traverse arcs and states until a new acoustic unit is indicated as an input label, the states remaining after processing data for a particular audio frame will have outgoing arcs that correspond to an acoustic unit. Those outgoing arcs for those states will then be considered by the ASR engine 258 as new data for the next feature vector comes from the acoustic model processing.

The number of such states, however, may be very large which may result in significant processing by the ASR engine 258. Thus, the ASR may use a different pruning setting, namely a threshold number of active states. The threshold number of active states indicate the threshold number of states the ASR engine 258 will consider after processing acoustic model data from a first audio frame before it considers acoustic model data from a next audio frame. That is, if a threshold number of active states is 1000, and after processing data for a first audio frame, the engine 258 is considering 1,250 states corresponding to the first audio frame, the ASR engine will discard 250 states before beginning processing of data corresponding to the next audio frame. The discarded states are the states that have the lowest scores among the remaining active states (even if the discarded states were within the beam width). Thus, the maximum number of states keeps the ASR engine 258 from being overwhelmed as it transitions from frame to frame.

As the ASR engine 258 traverses the FST it may store data corresponding to the states and arcs traversed along with their combined scores. That may include a table of entries, sometimes called tokens, where each token corresponds to a state in the search space (i.e., the traversed portions of the FST that fell within the beam width and the threshold number of active states). Each token may include a score representing the likelihood that the state is reached from the beginning of the utterance up until the frame of the state. The token may also include a pointer in the table to a previous state, such as the state most likely to lead to the present state, and the arc from the most likely previous state to the present state. The token may also include the input label and output label (if any) of the arc that leads from the most likely previous state to the present state. The input label and/or output label may be a pointer to a table of labels and may indicate a phoneme, senon, word, or other speech unit. The token may also include links to more than one previous state (and corresponding scores, arcs, labels, etc.).

Figure 5:
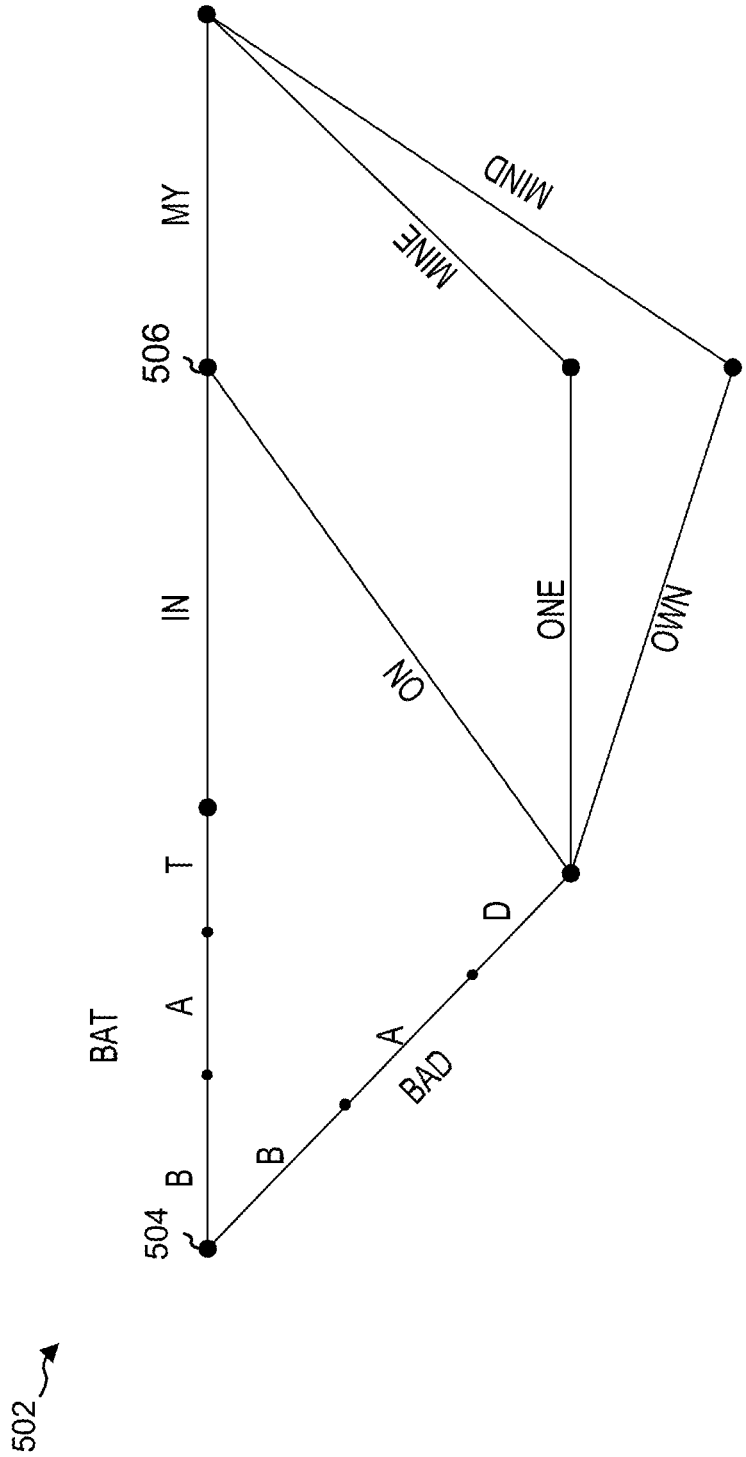
FIG. 5 illustrates a word lattice according to embodiments of the present disclosure.

As the ASR engine traverses portions of the FST, it may use the table of tokens representing the states and arcs traversed, along with their combined scores, to create a lattice of potential paths representing potential ASR results. A sample lattice is shown in FIG. 5. The lattice 502 shows multiple potential paths of speech recognition results that may have been determined by the ASR engine 258 by traversing an FST or by using different acoustic model/language model processing. Paths between large nodes represent potential words (for example "bad", "bay", etc.) and paths between smaller nodes represent potential phonemes (for example "B", "A", "T", and "B", "A", "D"). For purposes of illustration, individual phonemes are only shown for the first two words of the lattice. The two paths between node 504 and node 506 represent two potential word choices, "bat in" or "bad on". Each path point between nodes (such as a potential word) is associated with a recognition score. Each path across the lattice may also be assigned a recognition score. The highest recognition score path, where the recognition score is a combination of the acoustic model score, the language model score, and/or other factors, may be returned by the ASR engine 258 as the ASR result for the associated feature vectors. Following ASR processing, the ASR results may be sent to a downstream component, such as a speechlet component 290 for further processing (such as execution of a command included in the interpreted text). Thus the data preserved by the ASR engine 258 during traversal of the FST may result in a lattice representing the most likely possible ASR results (as the least likely results were discarded during pruning). The mostly likely path of the ASR results, sometimes called the Viterbi path, may be selected as the top scoring result for command execution.

FSTs can constitute the bulk of an ASR model, with HCLG being particularly large, sometimes reaching tens of gigabytes in some models. As noted above, an HCLG functionality maybe incorporated into a single FST. In other configurations, HCL functionality may be incorporated in one FST, whereas G functionality (i.e., functionality of a grammar or language model) may be incorporated into a different FST. In such as situation, an HCL FST is traversed using output from an acoustic model (as generally described above) to traverse the HCL FST, with the resulting output being one or more potential words and corresponding scores. When the end of a word is reached the HCL FST is traversed again anew (using further acoustic model output) for the next word. Each word(s) and corresponding score(s) from the HCL FST is then output for the system to use traverse the G FST. The G FST represents the possible word groupings (e.g., sentences) that the system may expect to receive. The G FST (or other form of language model) is constructed based on the universe of example text used by the system when building the language model.

Figure 6:
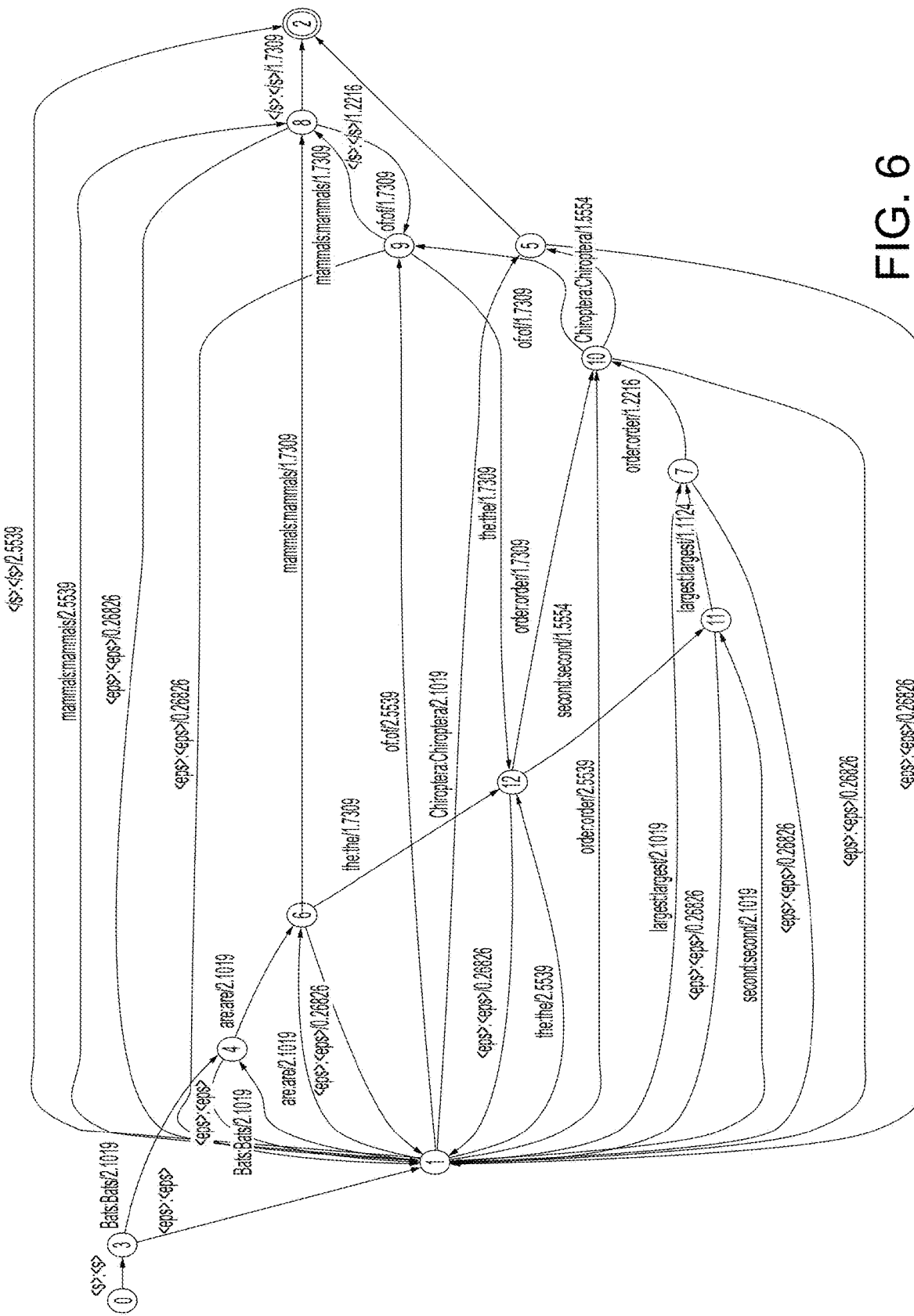
FIG. 6 illustrates a section of a finite state transducer according to embodiments of the present disclosure.

An example of a portion of a G FST is shown in FIG. 6. The FST potion shown in FIG. 6 is a portion of a G FST language model constructed from two sentences, the first being "bats are mammals of the order Chiroptera" and the second being "bats are the second largest order of mammals." The portion of the FST shown in FIG. 6 may normally appear in a much larger FST as part of a general ASR language model, but is shown in FIG. 6 for purposes of illustration. Further, while a complete G FST may be configured to recognize any sequence of the words shown in FIG. 6, the particular illustrated sequences may be more likely due to the construction of the FST (which itself is based on a universe of available text from a text corpus). To traverse the G FST, word outputs from an HCL FST (or other model configured to construct words from sounds output by an acoustic model) are used to determine which arcs to traverse along the G FST. As arcs are traversed, word output labels associated with those arcs are output to form the potential text output that is eventually output as the ASR result. Multiple paths through a G FST may be traversed (with respective scores) thus resulting in an N-best list output of a word string (e.g., a sentence) that potentially represents the input audio data.

Although a G FST may have an arbitrary structure, a language model may have an N-gram model. An N-gram is an ordered sequence of N words. Thus, a size 2 N-gram (also called a bi-gram) includes two words in order for example "I am," "I think," or the like. A size 3 N-gram (also called a trigram) includes two words in order for example "I like to," "I need to," or the like. Certain benefits to representing word groupings as N-grams in a language model FST include their ease of construction, fast computation during runtime decoding of input speech and efficient representation within the FST.

Statistical language models are a common component for speech and language processing systems such as speech recognition and machine translation. A common and widely used method for building language models is to train N-gram based models on large amounts of data. N-gram models are trained to maximize the likelihood of the entire training data. However, due to the short context of N-grams, they do not capture the nuances of topic, style, vocabulary, etc. in different subsets of the data, which can otherwise be used to improve the model predictions. Capturing this information becomes even more important when large amounts of out-of-domain data is available for training, but only a small amount of target in-domain data is available.

This mismatch between training data and testing data is present to a large degree when extending capabilities of an existing system, such as Alexa skills/speechlets. In these applications, a developer may provide a set of example utterances to help the speech and understanding models make sense of user requests. However, the statistical language model of most speech recognition systems is trained on a large corpus of text and optimized to maximize the overall likelihood on all user interactions rather than user interactions that are specific to a particular skill/speechlet. Thus, building a language model specific to a specific skill/speechlet may not be practical both due to the limited amount of sample utterances for a particular speechlet (which will lead to a less than robust language model) and due to the large number of speechlets operable using the system (which would lead to a large number of individual language models that the system may need to train and consider during runtime).

Here, the system may leverage the example utterances from all the applications to discover effective domains underlying a set of applications and use these effective domains to adapt the language model to each application. The effective domains represent applications/speechlets that are categorized not necessarily on the subject matter (e.g., shopping, music, etc.) of the application/speechlet, but rather on how a user may interact with the application/speechlet where similar sentence structure and/or language is used to invoke and/or interact with the speechlet. While there may be some correlation between applications in a same subject matter and applications in a same effective domain, there may also be some differences. Sentences that are in the form that is typical for interacting with a particular effective domain category of applications/speechlets are used to create language models for the category (as described below) and the category language models are then used to create a combined language model with different probabilities for different effective domain categories. Then at runtime the particular weights for the category may be applied, thus allowing the combined language model to be "customized" for different incoming utterances. As a speech processing system may handle thousands of requests every minute, each one for a different application, keeping a large adapted language model per application in memory is not feasible. Instead, the system may use an on-the-fly adaptation approach using the combined language model (which corresponds to the determined categories) which adds very little additional memory footprint without adding latency to the system.

The present approach uses clustering to identify the effective domains that make up all of the applications, and use weights estimated per application to adapt the language model at runtime to a given utterance.

Below is described the present approach to discover effective domains present in a set of applications followed by a description of algorithms to generate one language model per effective domain and estimate the interpolation weights for a given application. Following that is a discussion of application of the interpolation weights at runtime.

To create a combined language model that can be tuned differently at runtime based on a characteristic of an utterance, the system may first determine what characteristics may be considered for purposes of operating the combined language model at runtime. For example, one characteristic may be that the utterance corresponds to a particular speechlet or category/effective domain of speechlets that have similar syntax. For example, the utterance may be part of an ongoing dialog with a particular speechlet, where the speechlet belongs in a particular effective domain as explained herein. Another characteristic may be that the utterance originates from a user that belongs in a category of users such as users that may use certain idioms or other speech tendencies (for example users in a particular geographic region, in a certain age group, etc.). Another characteristic may be device type. Other characteristics may also be used. Sample utterances may be grouped by characteristic such that individual language models and then a combined language model (e.g., a language model configured with probabilities that can be weighted at runtime) can be created. Then at runtime the particular characteristic may be determined, the appropriate weights selected and used to adjust the probabilities in the combined language model, and then the adjusted probabilities used to perform ASR for an incoming utterance.

Techniques for creating the combined language model are described below using the effective domain of speechlets as the characteristic, though other characteristics may be used to create the combined language model using techniques similar to those described below.

For present purposes an effective domain or effective domain category may be considered a collection of utterances that have coherent sentence structure, syntax and/or semantics. The applications/speechlets that are operable using the system may be grouped into effective domains and effective domain categories. Doing such a grouping manually (e.g., by creating certain effective domain categories and using human operators to sort the applications into effective domains) may be prohibitively resource intensive and time consuming and further may not be scalable given how many applications a system may be adding to its capabilities. Thus a computer-operable technique for dividing applications into effective domains may be preferred.

Thus, the large set of applications of the system may be generated divided into a much smaller number of effective domains, K, that capture the different style and vocabulary of sentences each application expects. The number (K) of effective domains may be configurable. In order to discover these effective domains (and group applications into them) in an automated way, the system may learn a semantic representation for each application and cluster them to determine the underlying effective domains.

To group the applications, the present system may create utterance documents corresponding to text used to interact with the application. The system may then represent those documents (and thus the underlying application corresponding to the utterance document) as a multi-dimensional vector. Those vectors may then be used to determine the effective domains and then ultimately the language models. As described below, techniques such as k-means clustering using normalized latent semantic analysis (LSA), bag-of-words (BOW), or other vectors may be used to create the clusters.

Let an application be defined by an interaction model that contains the example phrases and entities that capture the different user interactions with it. Interactions that lead to the same action from the application are grouped under the same intent. Thus, an application $S_i$ can be represented as:

$$S_i = \{I_1, I_2, I_3, \ldots I_n\}; \{u_1, u_2, \ldots I_m\}$$

where $I_k$ is an intent and $u_i$ is an example user interaction for that intent provided by the application developer, or collected from user data. Thus an application developer may provide a number of sample utterances u for each intent I. The text of each such sample utterances may be included as an utterance text u. The system may also have collected example runtime utterances that invoke the particular intent. The text of those utterances may also be included as an utterance text u.

The user interactions $u_i$ are typically written as regular expressions or rules that express a large set of sentences, and can be sampled to generate different user interactions. For example, an interaction $u_i$="buy me some {FRUITS}", can be sampled for different values of fruits to generate actual sentences.

To get interaction data of an application, the system may generate the expected set of user interactions by sampling each intent within an application according to:

$$S_i = \{U_1, U_2, \ldots U_n\} \sim P(I|S) \quad (1)$$

where the intent distribution P(I|S) is either provided by the developer, or estimated from user data, or assumed to be uniform, and $U_j$'s are the set of utterance belonging to intent $I_j$ of the application. To represent this data as a set of utterance documents X that can be used in a clustering algorithm, there may be two levels of granularity
 1. App-level representation: x={Si} is generated by sampling equal number of user interactions from each application according to equation 1 and using each application as a document
 2. Intent-level representation: x={$U_j^k$} is generated by the sampling each application as above and creating one document each for intent k of application j Thus an utterance document x may include all the utterance text corresponding to either a particular application (an app-level representation) or all the utterance text corresponding to a particular intent (an intent-level representation).

Figure 7:
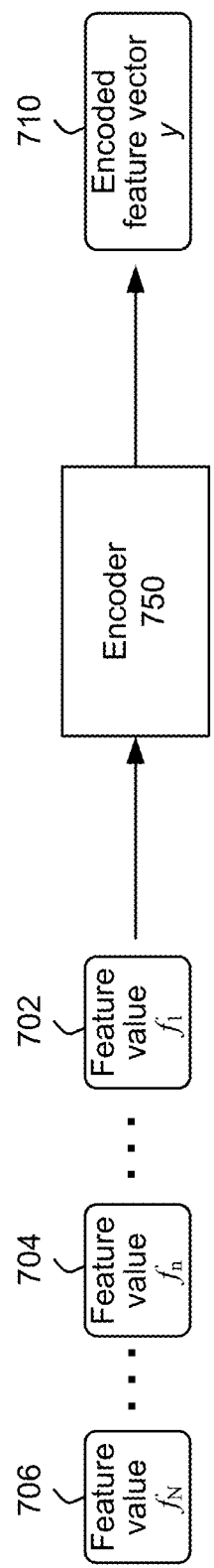
FIG. 7 illustrates operation of an encoder according to embodiments of the present disclosure.

To accomplish vector representations of various words, N-grams, sentences (such as those in an utterance document x), etc., the system may determine an encoded vector describing various properties of how the word, N-gram, sentence, etc. is used. In mathematical notation, given a sequence of feature data values $f_1, \ldots f_n, \ldots f_N$, with $f_n$ being a D-dimensional vector, an encoder $E(f_1, \ldots f_N)$=y projects the feature sequence to y, with y being a F-dimensional vector. F is a fixed length of the vector and is configurable depending on user of the encoded vector and other system configurations. For example, F may be between 100 and 1000 values for use in speech processing, but any size may be used. As shown in FIG. 7, feature values 702 through 706 may be input into an encoder 750 which will output an encoded feature vector 710 that represents the input feature values. Any particular encoder 750 will be configured to output vectors of the same size, thus ensuring a continuity of output encoded vector size from any particular encoder 750 (though different encoders may output vectors different fixed sizes) and enabling comparing different feature vectors y. The value y may be called an embedding of the sequence $f_1, \ldots f_N$. The length of $f_n$ and y are fixed and known a-priori, but the length of N of feature sequence $f_1, \ldots f_N$ is not necessarily known a-priori. The encoder E may be implemented as a neural network (NN), recurrent neural network (RNN), or other model. There are a variety of ways for the encoder 750 to consume the encoder input, including but not limited to:
 linear, one direction (forward or backward),
 bi-linear, essentially the concatenation of a forward and a backward embedding, or
 tree, based on parse-tree of the sequence,
In addition, an attention model can be used, which is another RNN or DNN that learns to "attract" attention to certain parts of the input. The attention model can be used in combination with the above methods of consuming the input.

FIG. 7 illustrates operation of the encoder 750. The input feature value sequence, starting with feature value $f_1$ 702, continuing through feature value $f_n$ 704 and concluding with feature value $f_N$ 706 is input into the encoder 750. The encoder 750 may process the input feature values as noted above. The encoder 750 outputs the encoded feature vector y 710, which is a fixed length feature vector of length F.

For encoding vector representations of N-grams, different feature values may be used. The feature values may include how the N-gram appears in the example text relative to other text. For example, where in a sentence the N-gram appears, what words can precede the N-gram, what words can follow the N-gram, the frequency of the N-gram in certain situations, etc.

As can be appreciated, many different characteristics of the N-gram may be represented in this manner. Many different types of feature data may be considered by the server. One example of a characteristic is a word embedding. A word embedding is a representation of how a word (or string of words) is typically used in language, as may be represented by how a word is used in the example text corpus (i.e., collection of text) or plurality of text corpuses. Such word embedding data may enable the system to determine synonyms of words or otherwise rearrange words when processing/answering an incoming question. To determine a word embedding or word usage data, using the data from one or more data sources 180, the system may analyze individual words and their respective usages. The usage characteristics for a particular word may be specific to a single data source or may represent usage of the word as it appears over multiple data sources. Usage characteristics corresponding to a word may be tracked and represented in a number of different ways. One way of representing word usage characteristics is with a data vector, where the data vector (such as encoded feature vector y 710) includes a number of characteristics representing how the word issued. For example, the vector may include characteristics indicating how often another word is used next to the subject word, how often the other word is used two words away from the subject word, etc. As can be appreciated, such vectors may become large, with thousands of characteristics resulting in thousands of data values (called dimensions) for each vector. The particular size of the vector may be configurable depending on the characteristics the system will evaluate when considering the usage of any particular word. Further, even with very large vectors, only certain dimensions of each vector may be evaluated when considering the usage of any particular word. With vectors available for each word of interest to the system (for example, all or some portion of the words in a data sources, ASR lexicon, or the like) the usage characteristics (e.g., usage vectors) may be compared against each other to determine which usage characteristics/vectors are similar. Similar word usage characteristics/vectors may indicate similar usages between individual words.

The system may then map multiple vectors, each corresponding to the usage of a particular word, into a vector space. Given the number of dimensions for each vector, the vector space may be a high dimensional vector space. A number of known techniques for manipulating vectors in high dimensional (or other) vector space may be used to compare analyze vectors and compare vectors to each other. One example for representing and analyzing word usage characteristic as vectors is the GloVe: Global Vectors for Word Representation project by Jeffery Pennington, Richard Socher, and Christopher D. Manning of the Computer Science Department of Stanford University published in 2014, though other techniques may be used. Further, vectors are one example of tracking and comparing word usage characteristics, other techniques may be used.

Figure 8:
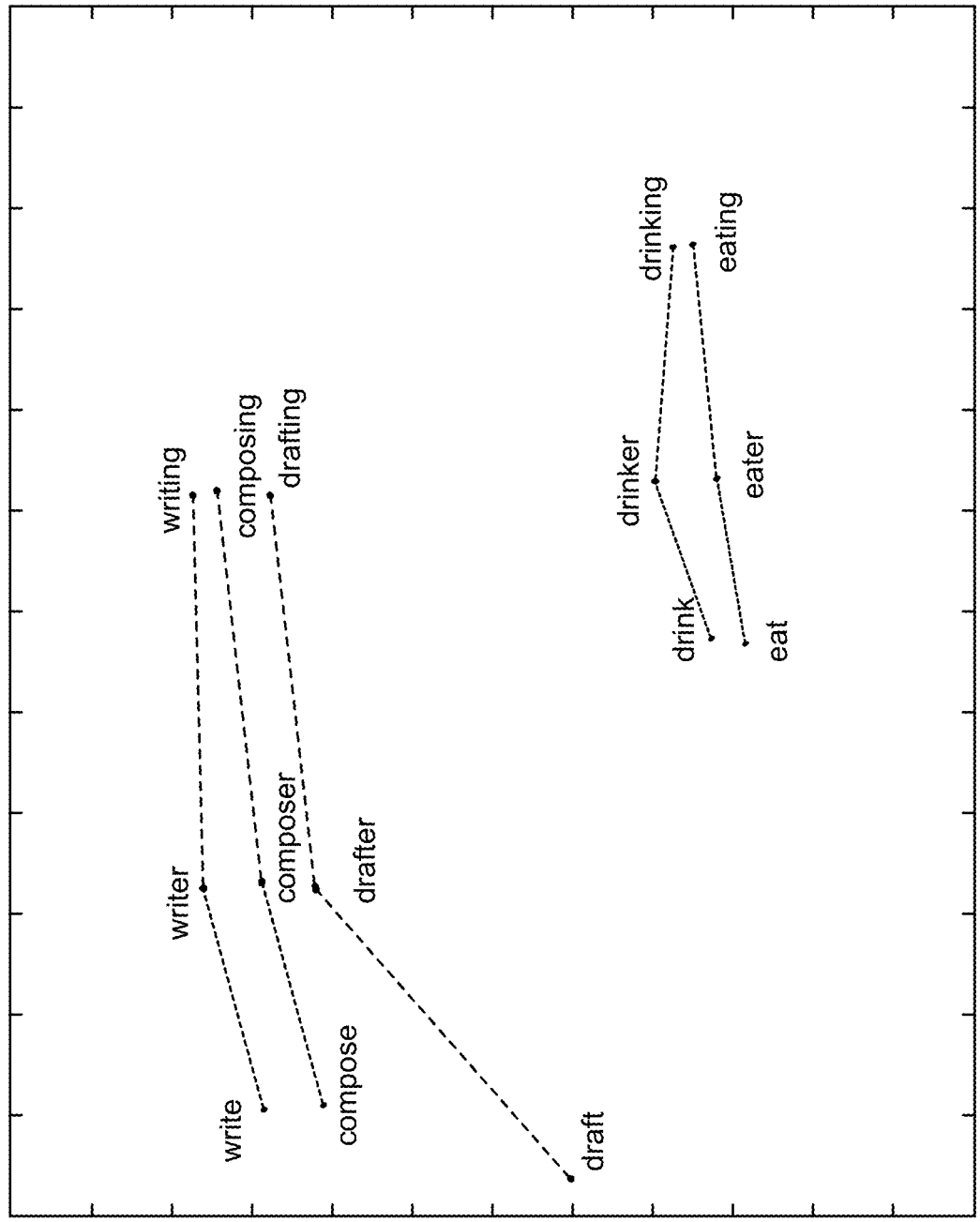
FIG. 8 illustrates representations of word usage similarity in a vector space.

Representing words in a vector space may be useful for showing the relationship between usage of individual words, as well as showing the relationship between usage of variations of a particular word and showing the relationship between the same usage variation across different word roots. Thus, a vector space may be used to represent sematic relationships between words as geometric relationship between vectors. For example, FIG. 8 illustrates a number of words in a hypothetical vector space where each point represents the vector location for the particular word. Although illustrated as located in a two-dimensional graph for discussion purposes, the usage vectors for the words illustrated in FIG. 8 (and the vectors representing utterance documents X) may be in a high dimensional space. Further, FIG. 8 is shown for example purposes only and the vector locations/relationships do not necessarily reflect a true graphing of the usage of the illustrated words.

As illustrated in FIG. 8, certain words that have similar meaning may be close to each other in the vector space (indicating a similarity of usage characteristics). Also, certain words that have different meanings may also be close to each other in the vector space (also indicating a similarity of usage characteristics). In the top portion of the illustration, words "writer," "composer" and "drafter" are located near each other, indicating that those three words are used similarly in the word data used to generate the vectors of FIG. 8. Similarly, the words "writing," "composing" and "drafting" are also located near each other, also indicating that those three words are used similarly. The words "write," "compose," and "draft" are not as close in the illustration, with "draft" in particular being located farther away from "write" and "compose" than those words are to each other. This distance may be due to other uses of the word "draft" that may differ from "write" and "compose," for example, "draft" has a known noun form, where the "write" and "compose" do not and "draft" may also have other meanings (such as a cold interior breeze) that differ from "write" and "compose."

Further, the variations of the words (save for "draft") have similar usage relationships relative to each other. For example, the usage relationships of "write" to "writer" to "writing" is similar to the usage relationship between "compose" to "composer" to "composing" as shown by the lines connecting those triplets of words. Other, non-illustrated variations may also exist (such as "writes," "drafted," etc.) with their own vectors and usage relationships to other words.

Words in the bottom corner of FIG. 8 exhibit similar relationships to each other as the words discussed above. The words "drink" and "eat" have different meanings, but similar usages as illustrated. Further, the usage relationships of "drink" to "drinker" to "drinking" are similar to the relationships of "eat" to "eater" to "eating." Also, "drink" shows a similar usage to "eat," "drinker" shows a similar usage to "eater" and "drinking" shows a similar usage to "eating." As "eat," "eater," and "eating" are all variations of a first word root, and "drink," "drinker," and "drinking" are all variations of a second word root, the system may use the usage relationships of these words to create new variations of another new word that shares usage with one of the variation forms. Thus, if a new word is found that is similar in usage to "eat" and/or "drink" the system may infer that the new word may have a variation of the form "x-er" or "x-ing" where x is the root of the new word. That is, if a vector corresponding to a new word is within a threshold distance to "eat" and/or "drink" the system may determine that the new word is used similarly to "eat" and/or "drink" and may create variations for the new word based on the variations of "eat" and/or "drink." Various known techniques, such as Cosine distance, Euclidean distance, Manhattan distance or other techniques may be used for determining a difference between word usage, or word usage vectors. Known techniques such as using a Levenshtein distance may be used for determining a difference between text strings.

Another approach to convert a text document (such as utterance document $x_i$) into a vector is to create a "bag-of-words" vector of size $|V|$ where $v_{ij}=\text{Count}(w_j|x_i)$ and V is the vocabulary over the document set X where X is a set of utterance documents such that $X=\{x_1, x_2 \ldots x_n\}$. However, for small number of documents, each with a few sentences, this vector can be quite sparse and can overfit on the given set of documents. Instead, latent semantic analysis (LSA) may be used to learn the low-dimensional latent representation of the given set of documents. A document-feature matrix, $A \in R^{m \times n}$ is constructed where $a_{i,j}$ is the value of feature j in document $x_i$. The features used are described below. LSA finds a representation of length t for the documents by applying truncated singular value decomposition (SVD) to the matrix:

$$A \approx U_t \Sigma_t V_t^T$$

A document vector $v_i^{LSA}$ then can be obtained by applying the SVD mapping on document feature vector $x_i$.

$$v_i^{LSA} = (\vec{x}_i) V_t$$

However, LSA may only capture the linguistic regularities present in the set of documents it is trained on, and does not generalize to new documents. To overcome this, the system may combine the LSA vector ($v_i^{LSA}$) of a document with a vector $_i^{embed}$ constructed using word embeddings trained on a much larger corpus.

$$v_i^{embed} = f(g(\vec{w}) \forall \vec{w} \in x_i)$$

$$v_i = (v_i^{LSA}, v_i^{embed})$$

where $\vec{w}$ are the word sequences in utterance document $x_i$, function $g(\vec{x})$ operates on the vectors corresponding to words in a sentence to generate sentence vectors and function $f(\vec{x})$ as a pooling function over all sentence vectors to build the document level representation. The choice of f and g may not necessarily affect the results. The word embeddings may be averaged to compute the vector at sentence level as well as document level.

Thus each utterance document (which corresponds to a particular application or intent) may be represented by a single vector $v_i$ that is a combination of the LSA vector $v_i^{LSA}$ for the utterance document $x_i$ along with the embedding vector $v_i^{embed}$ for the utterance document $x_i$. The vectors $v_i$ may comprise floating point numbers. Various features may be used to determine the vectors such as tf-idf (term frequency-inverse document frequency) for unigrams, bi-grams and tri-grams extracted from speechlet data, GloVe word embeddings (described above), or other features for purposes of creating the vectors. The system may also remove certain words (such as wakewords, stop words, or the like, for purposes of generating the vectors.

By using a combination of the two vectors, the system may get a local as well as global representation of each document. The individual vectors for each utterance document (and thus for each set of intents I or applications S) may then be clustered into K clusters using a k-means algorithm. A distance metric $d(x_i,x_j)$ may also be used to measure the cosine distance between the document vectors for clustering purposes.

Figure 9B:
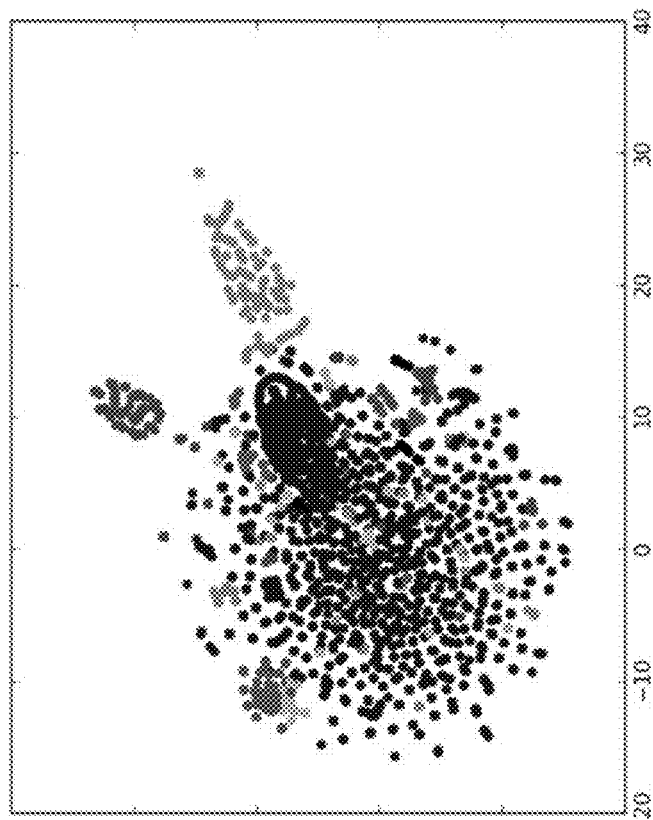
FIG. 9B illustrates vector representations of text corresponding to different intents clustered according to embodiments of the present disclosure.
Figure 9A:
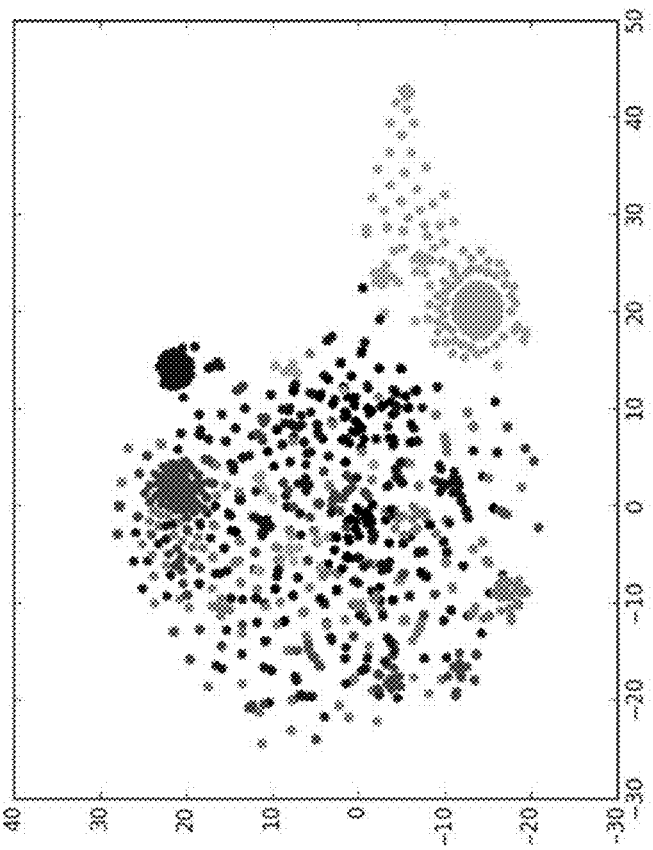
FIG. 9A illustrates vector representations of text corresponding to different applications clustered according to embodiments of the present disclosure.

As discussed above, utterance documents for clustering may be created either at either the application level or at the intent level. Clustering at app-level may return only a few coherent clusters, while many of them are clusters of many different skills. On the other hand, intent-level clustering may yield a better segregation of documents. An example of vector clustering is shown in FIG. 9A at App-level and in FIG. 9B at intent-level. Although shown as located in a two-dimensional graph for illustration purposes, the vectors for the utterance documents shown clustered illustrated in FIGS. 9A and 9B may be in a high dimensional space.

From the vector representations the system may determine K clusters where each vector (and thus the corresponding intent or application) will be considered to be in that cluster. The number of clusters K is configurable but may be selected so that the clusters (and/or their respective centroids) are far enough from each other that the clusters are sufficiently distinct for the ASR purposes described herein. For example K can be selected to be 20, 25, 30, or some other number and k-means clustering may be applied to the vector representations using that value of K. The K that results in the maximum variance between the clusters may be selected. Or some other value of K may be selected.

The result of the clustering operation will be a set of K centroid vectors, with each centroid vector corresponding to the centroid of a particular cluster of the K clusters. Further, the system may calculate the variance (e.g., distance) from each vector representation to each centroid so the system can determine how "far" each application/intent is to each cluster (with the vector difference/distance representing how closely the language used for the particular application/intent corresponds to the language used by other applications/intents in the cluster of that centroid). These distances may later be used to determine weights that will be used in the combined language model at ASR runtime. The system may also determine which vector representations are closest to which of the centroid vectors. The corresponding application/intent may then be "assigned" to that particular cluster. Thus each cluster will have a group of applications/intents that correspond to the cluster.

Once clusters are determined and applications/intents are assigned to a cluster, the system may create a specific language model for each cluster. Thus, if there are K clusters, the system may create K cluster-specific language models. To build a cluster-specific language model, the system may use as training data for the cluster-specific language model a collection of text including all the sample utterances corresponding to the particular applications within the cluster. Thus, if cluster A includes applications 1-5, the training data for the cluster A language model may include the utterances of utterance documents $x_1$ through $x_5$ (which in turn may include all the developer provided sample utterances as well as user utterances corresponding to the particular applications 1-5). If the sample utterances for the cluster are insufficient, the system may retrieve additional training data from other sources, such as text corpus(es) 180. That additional training data (in the form of text sentences) may then be assigned to particular clusters by creating vector representations for the sentences (for example using techniques described above), mapping those vector representations into the K clusters, and for each sentence (or paragraph or other text segment), determining the closest centroid to the vector representation of the sentence, and assigning that sentence to that particular cluster. In this manner the system may determine that the syntax/language of the sentence most closely maps to a particular cluster. The system may thus supplement the cluster-specific training data by obtaining additional text and assigning it to the most appropriate cluster. Thus a collection of text used to create a cluster specific language model may include the sample sentences for speechlets within the cluster as well as the additional training data associated with the cluster.

Thus, here the system may build one LM per application cluster. To build the LM for the $k^{th}$ cluster, one approach is to assign each sentence in the language model specific training set $D^{train}$, and development corpus, $D^{dev}$, to one of the K clusters and build the $k^{th}$ LM only on data assigned to that cluster. However, this approach may have two problems. The first problem is that some clusters might get assigned only a small fraction of the training data and will result in sparse language models for those clusters. The second problem is that the training data will be separated to maximize the cluster likelihood on the given set of applications, but may not generalize well to new applications.

To solve the above problem, the system may untie the clustering of training data from the K application clusters and cluster only the development data. This way, language models for each cluster may be trained on the same amount data but optimized on different development data. A technique for this is shown below in algorithm 1. The system may take M training LMs $G_{1 \to M}^{train}$ trained on different data sources as an input to the algorithm such that M>>K. The condition M>>K allows the language models of clusters to use different subsets of the training LMs. The application data, $D^{App}$, is clustered into K clusters, similar to the applications described above. To adapt the M models to an application cluster, the development data Ddev may be clustered into K sets of development data. The $k^{th}$ cluster model $LM_k$ is trained by interpolating the M training LMs to minimize perplexity on $D_k^{dev}$.

---

Algorithm 1: Algorithm for generating K application cluster LMs

Input : $G_{1 \to M}^{train}$, $D^{dev}$, $D^{App}$
Output: $LM_1, LM_2, \ldots, LM_K$
1   $C_{1 \to K}$ = Cluster($D^{App}$)
2   $D_{1 \to K}^{dev} \leftarrow \{ \}$
3   for sentence $\in D^{dev}$ do
4   | k = *NearestCluster*(sentence)
5   | Insert($D_k^{dev}$, sentence)
6   end
7   for k $\in C_{1 \to K}$ do
8   | $LM_k$ = Interpolate($G_{1 \to M}^{train}$, $D_k^{dev}$)
9   end

---

Using the compiled cluster-specific training data, the system may then create a cluster specific language model using the cluster-specific training data. For example, the system may build an N-gram language model for each cluster using that cluster's training data.

Give a sequence of words $\vec{w}$ a language model estimates the probability of the entire sequence. N-gram language models make the assumption that the probability of word $w_i$ depends only on previous n−1 words, known as the history $h_i$ for word i, which includes all the words in the sentence before word i. Thus $h_i = w_{i-1}, w_{i-2}, \ldots w_{i-n+1}$. The probability of a word sequence given can thus be written as:

$$P(\vec{w}) = \prod_{|\vec{w}|} p(w_i|h_i)$$

Each cluster-specific language model will have a particular probability for each N-gram depending on how the N-gram appears in the cluster-specific training data used to create the cluster-specific language model. Thus, as the training data is different, the probabilities of specific N-grams may differ across the cluster-specific language models. Thus, if there are K cluster specific language models (LMs), for a specific word sequence $\vec{w}_A$ there may be K different probabilities p, e.g., $p_1, p_2, \ldots p_K$.

A combined language model may then be created using the individual cluster-specific language models. To create the combined language model, all the N-grams of all the different cluster specific LMs may be included in the combined language model, but the probabilities for each N-gram may be constructed to rely on a combination of the cluster-specific probability and an interpolation weight that will determine how much each cluster-specific probability should factor into the final combined probability. As explained below, the specific interpolation weights may be based on what cluster corresponds to the particular utterance being processed so that at runtime the individual probabilities may be weighted and combined in a manner that corresponds to the particular cluster.

Figure 10:
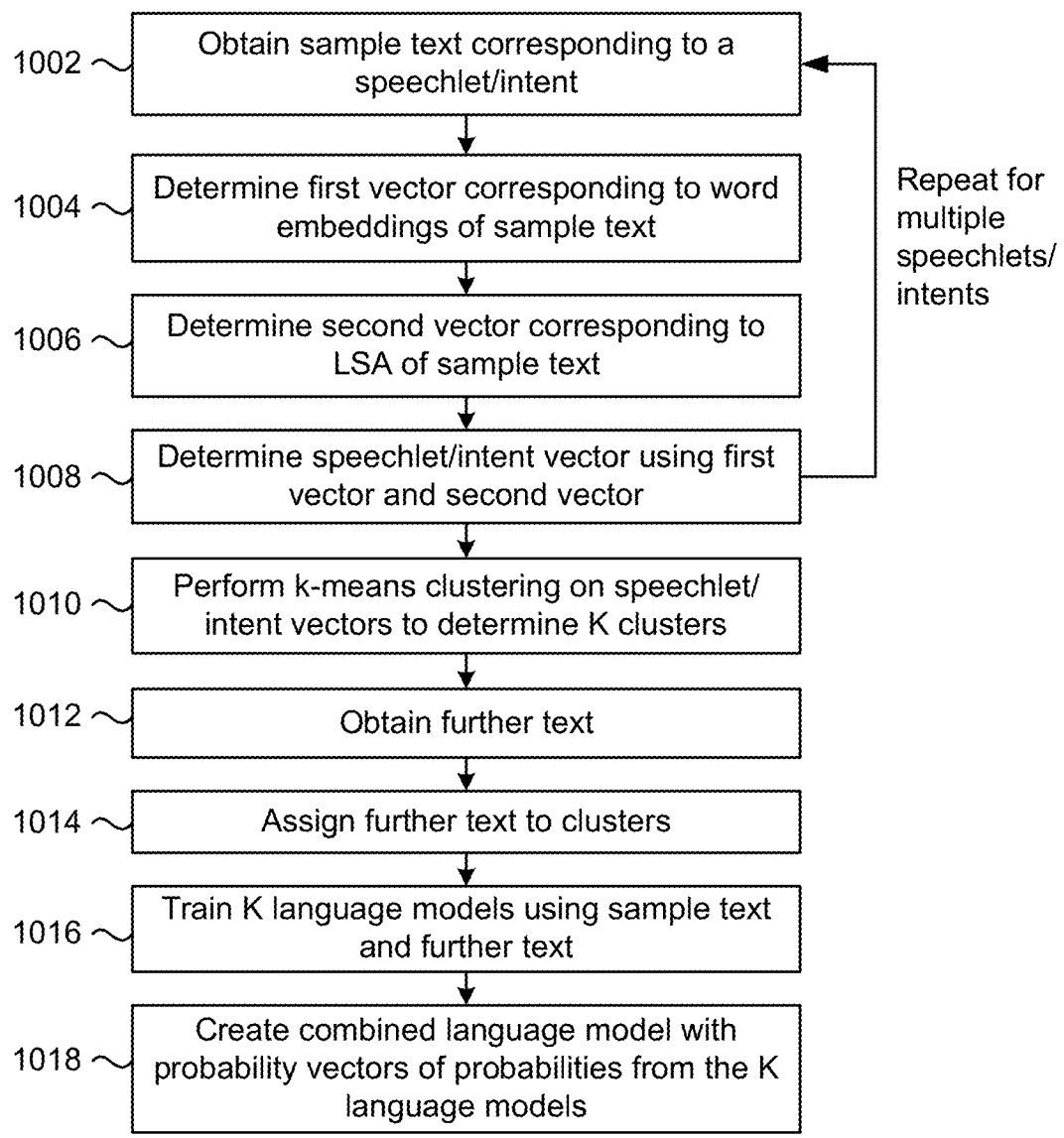
FIG. 10 illustrates creation of a combined language model at training according to embodiments of the present disclosure.

FIG. 10 illustrates the steps the system may take to create the combined language model. The system may obtain (1002) sample text corresponding to a speechlet or intent. The system may then determine (1004) a first vector corresponding to word embeddings of the sample text and may determine (1006) a second vector corresponding to LSA operations on the sample text. The system may then use the first and second vectors to determine (1008) a speechlet/intent vector. The system may then repeat steps 1002-1008 for all speechlets/intents that it wishes to consider for present purposes. The system may then perform (1010) k-means clustering on the speechlet/intent vectors to determine K clusters.

The system may then obtain (1012) further text and assign (1014) the further text to clusters. Using the text for the individual clusters the system may then train (1016) K cluster-specific language models where each cluster-specific language model includes its own probabilities for each portion of the language model (such as for each N-gram, FST arc, or the like).

Thus, for adapting the combined model to each application, the combined model can be represented as a combination of multiple LMs such that each component LM is targeted towards specific types of interactions. For example, the user interactions for an application that can handle sports related queries will be different from an application that can handle medical queries. The word patterns as well as the vocabulary will be significantly different for these models, and it would make sense to build separate components for each of these types of interactions. A combination of LMs can be represented as an interpolated language model where the probability of a word sequence $\vec{w}$ is calculated by using different interpolation weights, $\lambda_i$ for each LM in the combination:

$$p_{combined}(w_i|h_i) = \sum_k \lambda_k p_k(w_i|h_i)$$

such that the sum of all the interpolation weights is equal to 1 ($\Sigma_k \lambda_i = 1$). Thus for each k of the K clusters a different interpolation weight may be used for each probability such that at runtime the system may multiply the individual interpolation weight by the individual probability and sum the weighted probabilities to get the probabilities to be used at runtime.

For example, for a particular language model portion (such as an N-gram, arc of an FST, etc.) the combined language model may have an associated plurality of probabilities, with one probability per cluster, for example $p_1$, $p_2, \ldots p_K$. The probabilities may be known at the time the combined language model is created (e.g., at training time) as they are determined from the cluster-specific language models discussed above. Each probability may thus be associated with a particular cluster so that at runtime eventual determined particular interpolation weights $\lambda_k$ that correspond to the different clusters may be applied to the appropriate probability. Which interpolation weights are to be applied to a particular probability may not necessarily be known at training time because the system may select one or more interpolation weights based on a particular characteristic of the utterance (e.g., the speechlet that the user is interacting with).

Thus, for a particular language model portion, the combined language model may have a data structure that represents something like:

$$[p_1, p_2, \ldots p_K]$$

The combined language model may have many such data structures, each corresponding to a particular language model portion. Thus, for example, using arc 402 of the FST illustrated in FIG. 4A, the score of score of 0.15137 may be replaced with a vector of scores $[p_1, p_2 \ldots p_K]$. The other arcs (e.g., 404, 406, etc.) would have their own respective vectors of scores that may be different from those of 402 and/or from the other arcs. At runtime the individual interpolation weights are selected (with each particular weight corresponding to a particular cluster), multiplied by their respective probabilities to determine weighted probabilities, and then the weighted probabilities are summed (using the $p_{adjusted}$ equation below) to obtain the adjusted probability for that language model portion. The system may thus create adjusted language model data that includes the language model portion and the adjusted probability for the language model portion. At runtime this process may be repeated for each portion of the combined language model or just for the portions of the language model to be traversed in processing the particular input utterance. In one embodiment, once the particular characteristic of the utterance (e.g., the utterance corresponding to the speechlet) is known, the system may begin determining the adjusted probabilities using the interpolation weights to have the adjusted language model (or portion thereof) already ready to process an utterance, even if the audio data for the utterance has not yet been received by the system. In another embodiment the system may wait to determine the adjusted probabilities until the system has begun to receive the utterance audio data.

For example, for a particular runtime utterance, it may be determined that the utterance is part of an ongoing dialog involving speechlet A. Interpolation weights for speechlet A are determined. As explained below, those interpolation weights may be based on how close the vector for speechlet A is to the centroid of the corresponding cluster (e.g., $\lambda_{A1}$ may correspond to how close the vector for speechlet A is to the centroid of cluster 1, $\lambda_{A2}$ may correspond to how close the vector for speechlet A is to the centroid of cluster 2, and so on). The closer the speechlet vector is to the centroid, the higher the weight may be applied, thus resulting in a greater impact to the runtime operation for probabilities associated with clusters "closer" to speechlet A. The appropriate interpolation weights are then applied to the respective probabilities (for example, for an N-gram or other language model portion) and the weighted probabilities for that LM portion are summed to get the adjusted probability for that language model portion. Thus, in the above example:

$$p_{adjusted} = [\lambda_{A1} p_1 + \lambda_{A2} p_2 + \ldots \lambda_{AK} p_K]$$

The determined interpolation weights for a particular speechlet (e.g., $\lambda_{A1} \ldots \lambda_{AX}$ for speechlet A) may be used multiple times to determine adjusted probabilities for multiple different portions of the language model. Thus the same weights may be applied to different groups of probabilities in the language model. A weight vector may be configured including the interpolation weights (e.g., $\lambda_A = [\lambda_{A1}, \lambda_{A2} \ldots \lambda_{AK}]$). The weight vector may then be used to multiply the individual weights by the individual probabilities in the different probability vectors of the language model.

Given K clusters estimated as described above and the corresponding models, an application (new or existing in the original set) can belong to one or multiple clusters. Two methods may be used for estimation of interpolation weights between the K clusters LMs for a given application. In one technique, respective weights for each cluster may be assigned to each speechlet (or intent or other characteristic of the utterance) based on how closely the sentences for that speechlet (or characteristic) correlate to the sentences of the particular cluster. That correlation may be represented by a distance between a vector representation of the speechlet (or characteristic) and a centroid of the particular cluster.

The system may represent an application as a set of utterance documents $S_i = \{d_1, d_2, d_s\}$. When an application is represented at app-level, there is a single document representing the utterances for the application, thus s=1. When an application is represented at the intent-level there are n documents where n is the number of intents of the application, thus s=n. Given K cluster centroids, $c_k$, the system may calculate the probability of cluster k given document $d_i$ as:

$$p(k|d_i) = \frac{\text{cosine\_sim}(v_i - c_k)}{\sum_{j=1 \to s} \text{cosine\_sim}(v_j - c_k)}$$

Then the probability of cluster k for an application S can be expressed as:

$$p(k|S) = \sum_{i=1 \to s} p(k|d_i) * p(d_i|S)$$

where $p(k|d_i) = p(k|S)$ in case of intent-level representation, or $p(d_i|S) = 1$ for App-level representation. Probability $p(k|S)$ may used as the interpolation weight $\lambda_k$ for cluster k. Thus, the individual interpolation weights may be based on a correlation between the quality of the characteristic of the utterance (e.g., the speechlet) and a quality (e.g., the centroid) of the cluster/cluster-specific language model corresponding to the particular probability). The individual interpolation weight $\lambda_k$ for a particular cluster and particular speechlet may thus depend on the difference/distance between the centroid of the cluster and the vector representation of the speechlet (and/or the vector representation of the intents of the speechlet).

Thus, for each speechlet/application the system may calculate (either at runtime or during some pre-runtime training period) a group of interpolation weights for each cluster to be used when the particular speechlet/application is in focus or otherwise should be selected for purposes of weighting the combined language model and performing ASR. Thus, the system may perform the above operations for speechlet A to determine weights $\lambda_{A1}$ through $\lambda_{AK}$ and may select those weights and use them at runtime to determine adjusted probabilities for different portions of the LM for purposes of ASR operations when speechlet A is selected.

In another technique to determine interpolation weights, interpolation weights for a particular speechlet (or characteristic) may be selected in a manner that minimizes the perplexity of the language model for operation of the particular speechlet. Given K language models, and data from application S, $D_S^{App}$, interpolation weights for the application can be directly optimized by minimizing the perplexity on the application data. The system may obtain the probability scores for each word in the application data for each cluster language model and use Expectation-Maximization algorithm to generate the set of weights $\lambda_k$ that minimize perplexity. Thus the weights may be chosen for a particular speechlet that increases the likelihood that the combined language model (after application of the determined weights $\lambda_k$) will output sentences that correspond to the particular speechlets (e.g., increases the probability for sentences that can be found in the sample set for the particular speechlet).

In weighted finite state transducers (WFST) based ASR systems, N-gram models are represented as WFSTs where each state represents the N-gram history h and the weight on an out-going arc with label $w_i$ is the probability $p(w_i|h)$. To realize the interpolated model for an application using weights estimated above, one option is to create separate WSFTs for each application where the arc weight is calculated according to the $p_{combined}$ equation above. This is inefficient as these WFSTs can be quite large and the system would need to store one model per application. Instead, the system may use a more efficient one-the-fly interpolated WFST representation.

All application models may share the N-grams from all cluster models, and the only difference is the probability of the N-grams, $p(w_i|h)$. The system may create a new type of WFST where the N-gram probabilities from each component LM are kept separate (e.g., in a data structure such as $[p_1, p_2 \ldots p_K]$) and interpolated (e.g., multiplied by the appropriate interpolation weights) only at run-time. The interpolated WFST is constructed using union of N-grams in all the component LMs. In the regular WFST framework, the LM probability $p(w_i|h)$ is stored on each arc of the WFST as the log of the probability. In one-the-fly interpolation, weight on each arc of the FST is represented using a vector of probabilities $v_{1 \to k} = [p_1, p_2 \ldots p_K]$, with each vector corresponding to the component probability $p_k(w_i|h)$ for the particular arc. At query time, the FST takes interpolation weights as input and maps the vector to a single probability, for example according to the $p_{combined}$ or $p_{adjusted}$ equation. The iteration over all λ values can be expensive (in terms of computing resources) when the number of LM components is large. Thus, only a small subset of interpolation weights may tend be non-zero which can be attributed to an application belonging to only a small subset of clusters. In such cases, the computation cost can be reduced by storing the interpolation weights in a sparse representation and computing the adjusted probability only over the non-zero weights.

Figure 11A:
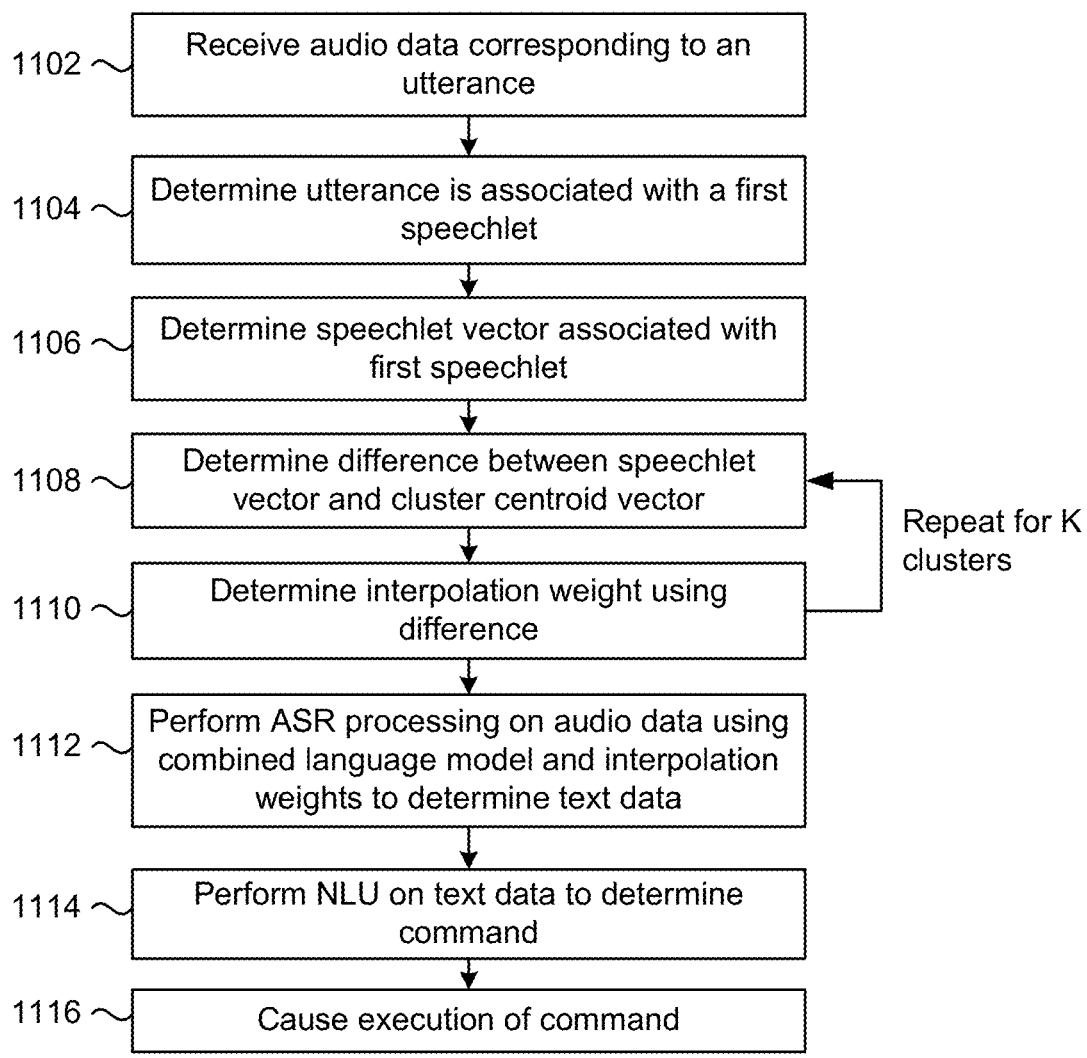
FIGS. 11A and 11B illustrates use of a combined language model at runtime according to embodiments of the present disclosure
Figure 11B:
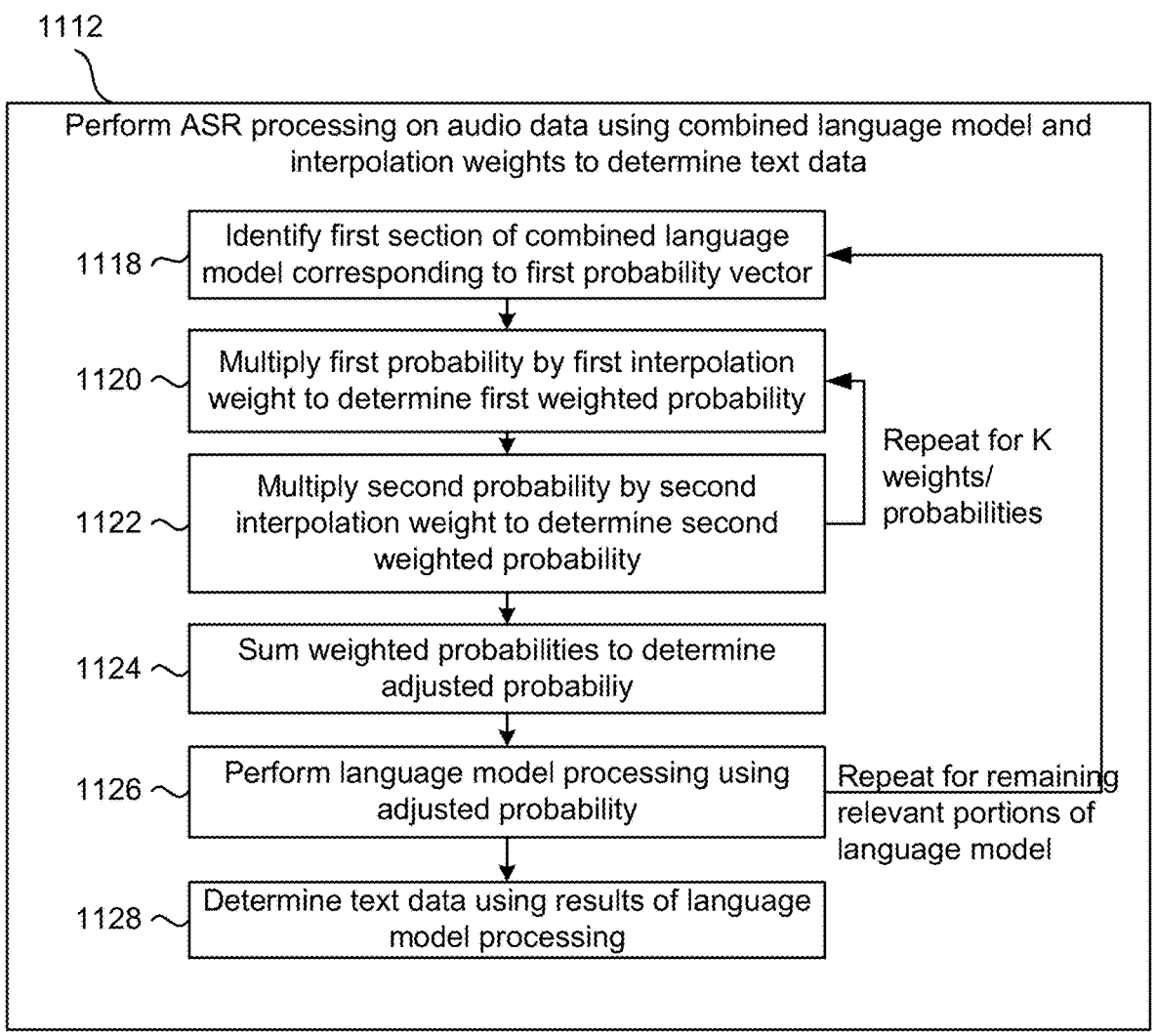

Operation of a combined language model to perform ASR is illustrated in FIGS. 11A and 11B. As shown in FIG. 11A, a system may receive (1102) audio data corresponding to an utterance. The system may determine (1104) that the utterance is associated with a first speechlet. The system may then determine (1106) a speechlet vector associated with the first speechlet. The speechlet vector may be stored in system memory ahead of time and accessed at runtime. The system may then determine (1108) the difference between the speechlet vector and a cluster centroid vector corresponding to a first cluster. The system may then determine (1110) an interpolation weight for the speechlet for the first cluster. The system may then repeat steps 1108 and 1110 for the K clusters to determine weights for the speechlet for each of the K clusters. Steps 1106-1110 may be performed during runtime (e.g., after the system determines audio data for an utterance is incoming or has been received). Alternatively, steps 1106-1110 may be performed ahead of time and the interpolation weights for different speechlets stored so that they may be accessed at runtime. The system may then perform (1112) ASR processing on the audio data using the combined language model and the interpolation weights to determine text data. The system may then perform (1114) NLU on the text data to determine a command and cause (1116) the command to be executed.

Details for performing (1112) ASR using the combined language model are shown in FIG. 11B. First the system may process the audio data using an acoustic model (not shown in FIG. 11B). The system may then use the results of the acoustic model processing to operate the combined language model. The system may identify (1118) a first section of the combined language model, where the first section corresponds to a first probability vector including a plurality of probabilities corresponding to the cluster-specific language models. The system may then multiply (1120) a first probability in the vector by a first interpolation weight to determine a first weighted probability. The first interpolation weight may correspond to how closely the particular speechlet corresponding to the utterance correlates to the cluster of the first probability. The system may also multiply (1122) a second probability in the vector by a second interpolation weight to determine a second weighted probability. The second interpolation weight may correspond to how closely the particular speechlet corresponding to the utterance correlates to the cluster of the second probability. The system may repeat this multiplication for the K weights/probabilities to determine K weighted probabilities. The system may then sum (1124) the weighted probabilities to determine an adjusted probability. The system may then perform (1126) language model processing using the adjusted probability. The system may then repeat steps 1118-1126 as part of ASR processing to operate/traverse the language model based on the audio data/acoustic model output to determine (1128) the text corresponding to the utterance.

During system operation a set of default or other interpolation weights may be determined for an initial utterance to the system while characteristic specific weights (such as speechlet specific weights) may be used for later utterances. Such weights may not necessarily be application specific but may be generic to the system, to a user, to a user category, or the like. Such weights may be used for the initial utterance, and then further utterances, for example further utterances in a dialog, may be processed by the system performing ASR using speechlet-specific interpolation weights.

User specific weights may be determined by taking example utterances from the user, charting them in the clusters as described above, and creating interpolation weights based on the user-specific example utterance vectors and the cluster centroids. Alternatively, the system may average interpolation weights based on skills enabled by the user. Other techniques may also be used.

For example, the system may interact with the user during a dialog. A dialog is an exchange between the user and the system where the user speaks a command and the system executes it. While many dialogs involve a single utterance, many dialogs may involve many different utterances to ultimately execute the action called for by the user. For example, if the user asks the system to order a pizza, the system may invoke a pizza ordering speechlet and may prompt the user several times for several utterances to obtain the data from the user needed to complete the pizza order (e.g., toppings, time of delivery, any additional items to order, etc.). Another example may be the user invoking a quiz game speechlet, where multiple questions are asked of the user and the user responds with utterances that are processed by the system and whose text data is sent to the quiz show speechlet. Each utterance of the dialog may have a unique utterance ID but may also share a common dialog ID so that the system can process incoming audio data knowing that it is associated with a particular dialog. The later utterances of a dialog may not necessarily include a wakeword each time.

If a user enters into a dialog corresponding to a particular speechlet, the interpolation weights for that speechlet may be used for ASR processing of utterances within the dialog.

The system may also determine what interpolation weights to be used for ASR for a particular utterance based on other factors such as user interaction history and/or patterns (e.g., if a speechlet is likely to be invoked at a certain time), what device is being used (e.g., if ASR processing should be customized for a particular device).

Interpolation weights and cluster mapping may be updated following receipt of new user interactions with the system to account for updated ways users interact with the system. More recent utterances may be weighted more heavily than older utterances for purposes of determining interpolation weights and/or cluster assignments.

Figure 12:
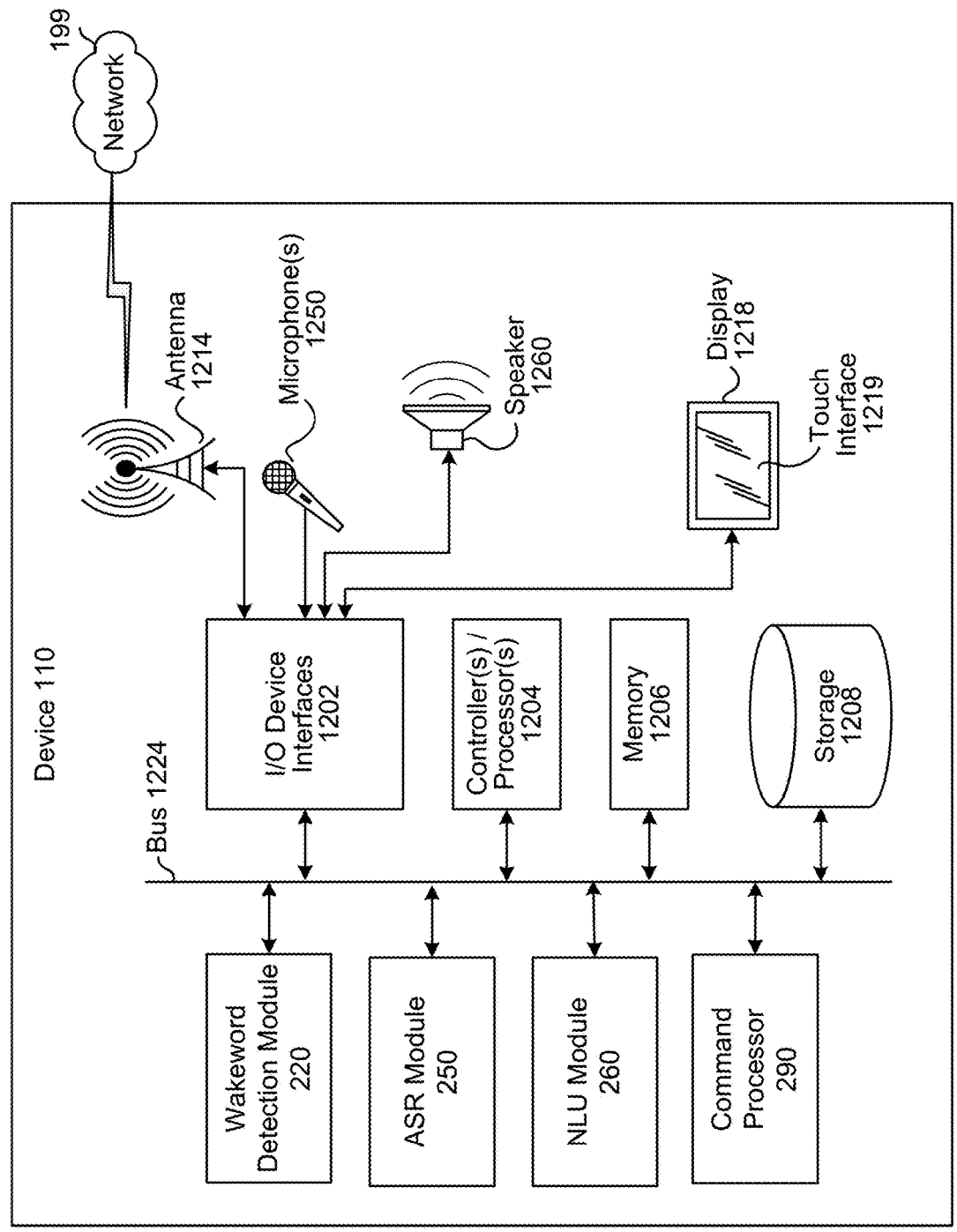
FIG. 12 is a block diagram conceptually illustrating example components of a device according to embodiments of the present disclosure.
Figure 13:
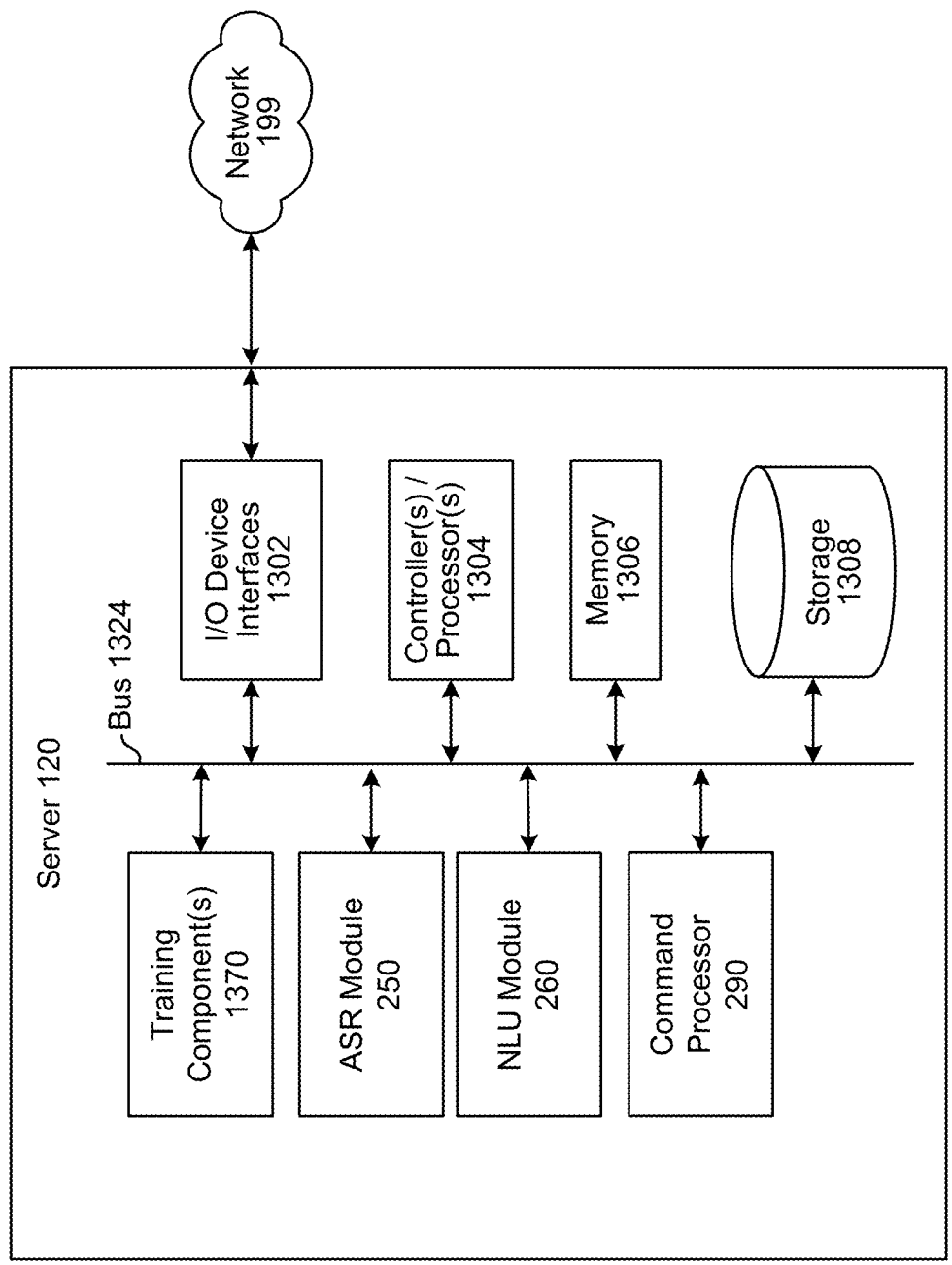
FIG. 13 is a block diagram conceptually illustrating example components of a server according to embodiments of the present disclosure.

FIG. 12 is a block diagram conceptually illustrating a local device 110 that may be used with the described system. FIG. 13 is a block diagram conceptually illustrating example components of a remote device, such as a remote server 120 that may assist with ASR, NLU processing, or command processing. Multiple such servers 120 may be included in the system, such as one server(s) 120 for training ASR models, one server(s) for performing ASR, one server(s) 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (1204/1304), that may each include a central processing unit (CPU) for processing data and computer-readable instructions, and a memory (1206/1306) for storing data and instructions of the respective device. The memories (1206/1306) may individually include volatile random access memory (RAM), non-volatile read only memory (ROM), non-volatile magnetoresistive (MRAM) and/or other types of memory. Each device may also include a data storage component (1208/1308), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1202/1302).

Computer instructions for operating each device (110/120) and its various components may be executed by the respective device's controller(s)/processor(s) (1204/1304), using the memory (1206/1306) as temporary "working" storage at runtime. A device's computer instructions may be stored in a non-transitory manner in non-volatile memory (1206/1306), storage (1208/1308), or an external device(s). Alternatively, some or all of the executable instructions may be embedded in hardware or firmware on the respective device in addition to or instead of software.

Each device (110/120) includes input/output device interfaces (1202/1302). A variety of components may be connected through the input/output device interfaces, as will be discussed further below. Additionally, each device (110/120) may include an address/data bus (1224/1324) for conveying data among components of the respective device. Each component within a device (110/120) may also be directly connected to other components in addition to (or instead of) being connected to other components across the bus (1224/1324).

Referring to the device 110 of FIG. 12, the device 110 may include a display 1218, which may comprise a touch interface 1219. Or the device 110 may be "headless" and may primarily rely on spoken commands for input. As a way of indicating to a user that a connection between another device has been opened, the device 110 may be configured with a visual indicator, such as an LED or similar component (not illustrated), that may change color, flash, or otherwise provide visual indications by the device 110. The device 110 may also include input/output device interfaces 1202 that connect to a variety of components such as an audio output component such as a speaker 1260, a wired headset or a wireless headset (not illustrated) or other component capable of outputting audio. The device 110 may also include an audio capture component. The audio capture component may be, for example, a microphone 1250 or array of microphones, a wired headset or a wireless headset (not illustrated), etc. The microphone 1250 may be configured to capture audio. If an array of microphones is included, approximate distance to a sound's point of origin may be performed acoustic localization based on time and amplitude differences between sounds captured by different microphones of the array. The device 110 (using microphone 1250, wakeword detection module 220, ASR module 250, etc.) may be configured to determine audio data corresponding to detected audio data. The device 110 (using input/output device interfaces 1202, antenna 1214, etc.) may also be configured to transmit the audio data to server 120 for further processing or to process the data using internal components such as a wakeword detection module 220.

For example, via the antenna(s), the input/output device interfaces 1202 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device 110 and/or server 120 may include an ASR module 250. The ASR module in device 110 may be of limited or extended capabilities. The ASR module 250 may include the language models 254 stored in ASR model storage component 252, and a ASR engine 258 that performs the automatic speech recognition process. If limited speech recognition is included, the ASR module 250 may be configured to identify a limited number of words, such as keywords detected by the device, whereas extended speech recognition may be configured to recognize a much larger range of words.

The device 110 and/or server 120 may include a limited or extended NLU module 260. The NLU module in device 110 may be of limited or extended capabilities. The NLU module 260 may comprising the named entity recognition module 262, the intent classification module 264 and/or other components. The NLU module 260 may also include a stored knowledge base and/or entity library, or those storages may be separately located.

The device 110 and/or server 120 may also include a speechlet component 290 that is configured to execute commands/functions associated with a spoken command as described above.

The device 110 may include a wakeword detection module 220, which may be a separate component or may be included in an ASR module 250. The wakeword detection module 220 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 110 may be configured collectively to identify a set of the directional audio signals in which the wake expression is detected or in which the wake expression is likely to have occurred.

The wakeword detection module 220 receives captured audio and processes the audio (for example, using model(s) 232) to determine whether the audio corresponds to particular keywords recognizable by the device 110 and/or system 100. The storage 1208 may store data relating to keywords and functions to enable the wakeword detection module 220 to perform the algorithms and methods described above. The locally stored speech models may be pre-configured based on known information, prior to the device 110 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 110 prior to the user device 110 being delivered to the user or configured to access the network by the user. The wakeword detection module 220 may access the storage 1208 and compare the captured audio to the stored models and audio sequences using audio comparison, pattern recognition, keyword spotting, audio signature, and/or other audio processing techniques.

The server may also include a training component 1370 for training or creating various functions, language, models, classifiers, FSTs, or other such items discussed above. Various machine learning techniques may be used to perform various steps in determining how to weigh incoming features to a function or model used to adjust the ASR processors at runtime. Models/functions may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

As noted above, multiple devices may be employed in a single speech processing system. In such a multi-device system, each of the devices may include different components for performing different aspects of the speech processing. The multiple devices may include overlapping components. The components of the devices 110 and server 120, as illustrated in FIGS. 12 and 13, are exemplary, and may be located a stand-alone device or may be included, in whole or in part, as a component of a larger device or system.

Figure 14:
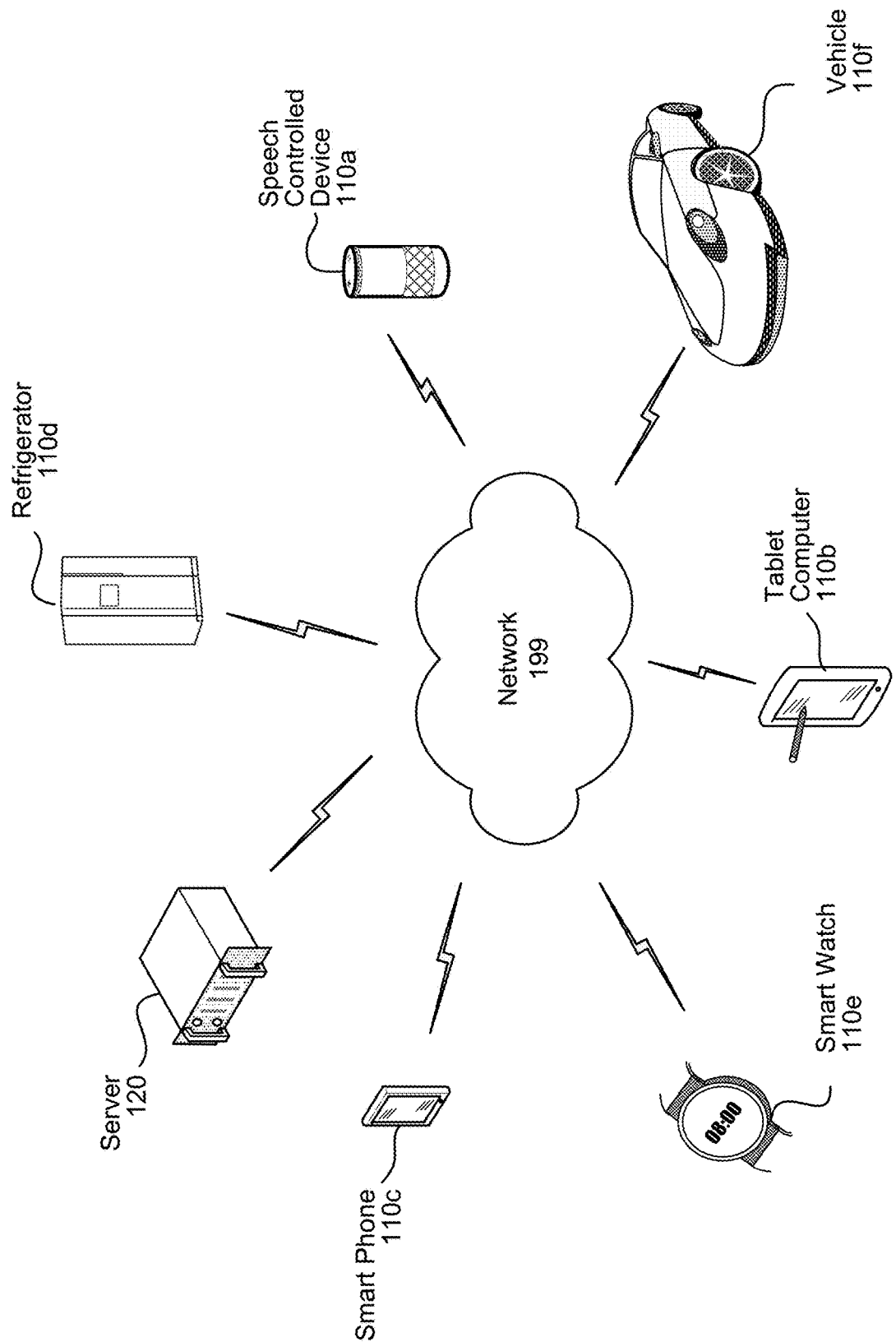
FIG. 14 illustrates an example of a computer network for use with the system.

As illustrated in FIG. 14 multiple devices (120, 120x, 110a to 110f) may contain components of the system 100 and the devices may be connected over a network 199. Network 199 may include a local or private network or may include a wide network such as the internet. Devices may be connected to the network 199 through either wired or wireless connections. For example, a speech controlled device 110a, a tablet computer 110b, a smart phone 110c, a refrigerator 110d, a smart watch 110e, and/or a vehicle 110f may be connected to the network 199 through a wireless service provider, over a WiFi or cellular network connection or the like. Other devices are included as network-connected support devices, such as a server 120, application developer devices 120x, or others. The support devices may connect to the network 199 through a wired connection or wireless connection. Networked devices 110 may capture audio using one-or-more built-in or connected microphones 1250 or audio capture devices, with processing performed by ASR, NLU, or other components of the same device or another device connected via network 199, such as an ASR 250, NLU 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, such as the acoustic front end 256, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for performing automatic speech recognition, the computer-implemented method comprising:
receiving audio data corresponding to an utterance;
determining the utterance corresponds to a first speechlet;

determining a plurality of weights corresponding to the first speechlet, the plurality of weights including a first weight corresponding to a first collection of sample text and a second weight corresponding to a second collection of sample text;
identifying language model data including a plurality of probabilities corresponding to a word sequence, the plurality of probabilities including a first probability corresponding to the first collection of sample text and a second probability corresponding to the second collection of sample text;
multiplying the first probability by the first weight to determine a first weighted probability;
multiplying the second probability by the second weight to determine a second weighted probability;
summing at least the first weighted probability and second weighted probability to determine an adjusted probability;
determining adjusted language model data including the word sequence associated with the adjusted probability;
performing automatic speech recognition using the audio data and the adjusted language model data to determine text data; and
causing execution of a command represented in the text data.

2. The method of claim 1, wherein:
the language model data further includes a second plurality of probabilities corresponding to a second word sequence, the second plurality of probabilities including a first probability of the second plurality of probabilities corresponding to the first collection of sample text and a second probability of the second plurality of probabilities corresponding to the second collection of sample text; and
the method further comprises:
multiplying the first probability of the second plurality of probabilities by the first weight to determine a weighted probability corresponding to the second word sequence and the first collection of sample text,
multiplying the second probability of the second plurality of probabilities by the second weight to determine a weighted probability corresponding to the second word sequence and the second collection of sample text,
summing at least the weighted probability corresponding to the second word sequence and the first collection of sample text and weighted probability corresponding to the second word sequence and the second collection of sample text to determine a second adjusted probability, and
including in the adjusted language model data the second word sequence associated with the second adjusted probability.

3. The method of claim 1, further comprising, during a training period prior to receiving the audio data:
determining a plurality of sentences corresponding to the first speechlet;
determining a first vector corresponding to word embeddings of the plurality of sentences;
determining a second vector corresponding to a latent semantic analysis of the plurality of sentences;
determining a third vector representing the plurality of sentences, wherein the third vector is determined using the first vector and the second vector;
determining a difference between the third vector and a fourth vector corresponding to the first collection of sample text; and
determining the first weight using the difference.

4. A computer-implemented method comprising:
receiving audio data corresponding to an utterance;
identifying language model data including a language model portion representing a word sequence associated with at least a first probability corresponding to a first collection of text and a second probability corresponding to a second collection of text;
determining at least a first weight and a second weight corresponding to at least one characteristic of the utterance, the first weight corresponding to the first collection of text and a second weight corresponding to the second collection of text;
multiplying the first probability by the first weight to determine a first weighted probability;
multiplying the second probability by the second weight to determine a second weighted probability;
determining an adjusted probability using at least the first weighted probability and the second weighted probability;
determining adjusted language model data including the language model portion associated with the adjusted probability; and
performing speech recognition processing using the audio data and the adjusted language model data to determine text data.

5. The computer-implemented method of claim 4, wherein determining the first probability and the second probability is performed after receiving the audio data.

6. The computer-implemented method of claim 4, wherein
determining the adjusted probability comprises:
summing at least the first weighted probability and second weighted probability to determine the adjusted probability.

7. The computer-implemented method of claim 4, wherein the first probability is associated with a first language model created using the first collection of text and the second probability is associated with a second language model created using the second collection of text.

8. The computer-implemented method of claim 7, further comprising:
determining the first language model includes an association between the first probability and the word sequence;
determining the second language model includes an association between the second probability and the word sequence;
creating a data structure including at least the first probability and the second probability; and
determining a third language model including the language model data, wherein the language model data includes the word sequence associated with the data structure.

9. The computer-implemented method of claim 4, wherein:
the first weight corresponds to a first correspondence between the characteristic and a first quality of the first collection of text; and
the second weight corresponds to a second correspondence between the characteristic and a second quality of the second collection of text.

10. The computer-implemented method of claim 4, wherein:

the first probability corresponds to how the word sequence appears in the first collection of text, and the second probability corresponds to how the word sequence appears in the second collection of text.

11. A system comprising:
at least one processor; and
at least one memory including instructions that, when executed by the at least one processor, cause the system to:
  receive audio data corresponding to an utterance;
  identify language model data including a language model portion representing a word sequence associated with at least a first probability corresponding to a first collection of text and a second probability corresponding to a second collection of text;
  determine at least a first weight and a second weight corresponding to at least one characteristic of the utterance, the first weight corresponding to the first collection of text and a second weight corresponding to the second collection of text;
  multiply the first probability by the first weight to determine a first weighted probability;
  multiply the second probability bar the second weight to determine a second weighted probability;
  determine an adjusted probability using at least the first weighted probability and the second weighted probability;
  determine adjusted language model data including the language model portion associated with the adjusted probability; and
  perform speech recognition processing using the audio data and the adjusted language model data to determine text data.

12. The system of claim 11, wherein the instructions to determine the first probability and the second probability are configured to be executed after the instructions to receive the audio data.

13. The system of claim 11, wherein
the instructions to determine the adjusted probability comprise instructions to:
  sum at least the first weighted probability and second weighted probability to determine the adjusted probability.

14. The system of claim 11, wherein the first probability is associated with a first language model created using the first collection of text and the second probability is associated with a second language model created using the second collection of text.

15. The system of claim 14, wherein the memory includes further instructions that, when executed by the at least one processor, further cause the system to:
  determine the first language model includes an association between the first probability and the word sequence;
  determine the second language model includes an association between the second probability and the word sequence;
  create a data structure including at least the first probability and the second probability; and
  determine a third language model including the language model data, wherein the language model data includes the word sequence associated with the data structure.

16. The system of claim 11, wherein:
the first weight corresponds to a first correspondence between the characteristic and a first quality of the first collection of text; and the second weight corresponds to a second correspondence between the characteristic and a second quality of the second collection of text.

17. The computer-implemented method of claim 4, further comprising:
  prior to performing the speech recognition processing, determining the utterance corresponds to an application,
  wherein determining the first weight and the second weight is based at least in part on the utterance corresponding to the application.

18. The computer-implemented method of claim 17, wherein the application is a skill or speechlet associated with a speech-processing system.

19. The computer-implemented method of claim 17, wherein the audio data is first audio data received from a first device, and the method further comprises:
  prior to receiving the first audio data from the first device, receiving second audio data from the first device;
  processing the second audio data to determine a request to invoke the application;
  initiating a dialog involving the first device and the application; and
  determining the first audio data is part of an ongoing dialog corresponding to the application, wherein determining the utterance corresponds to the application is based at least in part on determining the first audio data is associated with the ongoing dialog.

20. The computer-implemented method of claim 19, further comprising:
  performing automatic speech recognition (ASR) processing on the first audio data to generate ASR output data;
  performing natural language understanding (NLU) processing on the ASR output data to generate NLU output data including at least first intent data indicating an intent of the utterance; and
  determining, based on the NLU output data, that the utterance represents the request to invoke the application.

21. The system of claim 11, wherein:
the first probability corresponds to the word sequence appears in the first collection of text, and
the second probability corresponds to how the word sequence appears in the second collection of text.

22. The system of claim 11, wherein the memory includes further instructions that, when executed by the at least one processor, further cause the system to:
  prior to performing the speech recognition processing, determining the utterance corresponds to an application,
  wherein the instructions to determine the first weight and the second weight are based at least in part on the utterance corresponding to the application.

23. The system of claim 22, wherein the application is a skill or speechlet associated with a speech-processing system.

24. The system of claim 22, wherein the audio data is first audio data received from a first device, and the memory includes further instructions that, when executed by the at least one processor, further cause the system to:
  prior to receiving the first audio data from the first device, receive second audio data from the first device;
  process the second audio data to determine a request to invoke the application;
  initiate a dialog involving the first device and the application; and determine the first audio data is part of an ongoing dialog corresponding to the application, wherein the instructions cause the system to determine that the utterance corresponds to the application based at least in part on determining the first audio data is associated with the ongoing dialog.

25. The system of claim 24, wherein the memory includes further instructions that, when executed by the at least one processor, further cause the system to:
perform automatic speech recognition (ASR) processing on the first audio data to generate ASR output data;
perform natural language understanding (NLU) processing on the ASR output data to generate NLU output data including at least first intent data indicating an intent of the utterance; and
determine, based on the NLU output data, that the utterance represents the request to invoke the application.

\* \* \* \* \*